US008657572B2

(12) United States Patent
Presz, Jr. et al.

(10) Patent No.: US 8,657,572 B2
(45) Date of Patent: Feb. 25, 2014

(54) NACELLE CONFIGURATIONS FOR A SHROUDED WIND TURBINE

(75) Inventors: Walter M. Presz, Jr., Wilbraham, MA (US); Michael J. Werle, West Hartford, CT (US); Thomas J. Kennedy, III, Wilbraham, MA (US); William Scott Keeley, Charleston, RI (US)

(73) Assignee: FloDesign Wind Turbine Corp., Waltham, MA (US)

( * ) Notice: Subject to any disclaimer, the term of this patent is extended or adjusted under 35 U.S.C. 154(b) by 819 days.

(21) Appl. No.: 12/793,931

(22) Filed: Jun. 4, 2010

(65) Prior Publication Data
US 2011/0058937 A1    Mar. 10, 2011

Related U.S. Application Data

(63) Continuation-in-part of application No. 12/054,050, filed on Mar. 24, 2008, now Pat. No. 8,021,100.

(60) Provisional application No. 60/919,588, filed on Mar. 23, 2007, provisional application No. 61/184,026, filed on Jun. 4, 2009.

(51) Int. Cl.
F03D 1/04    (2006.01)

(52) U.S. Cl.
USPC .......................................... 415/227

(58) Field of Classification Search
USPC ............... 415/2.1, 4.1, 4.3, 4.5, 227
See application file for complete search history.

(56) References Cited

U.S. PATENT DOCUMENTS

| | | | |
|---|---|---|---|
| 1,312,021 A | 8/1919 | Dickinson et al. | |
| 3,579,993 A | 5/1971 | Tanner et al. | |
| 3,986,787 A | 10/1976 | Mouton et al. | |
| 4,021,135 A * | 5/1977 | Pedersen et al. | 415/208.2 |
| 4,038,848 A | 8/1977 | Ichiryu et al. | |
| 4,075,500 A | 2/1978 | Oman et al. | |
| 4,077,206 A | 3/1978 | Ayyagari | |
| 4,140,433 A | 2/1979 | Eckel | |
| 4,166,596 A | 9/1979 | Mouton, Jr. et al. | |
| 4,204,799 A | 5/1980 | de Geus | |

(Continued)

FOREIGN PATENT DOCUMENTS

| | | |
|---|---|---|
| CN | 100 487 239 C | 5/2009 |
| EP | 719945 A1 * | 7/1996 |

(Continued)

OTHER PUBLICATIONS

International Search Report and Written Opinion for Appl. No. PCT/US2010/037383 dated Apr. 4, 2011.

(Continued)

Primary Examiner — Richard Edgar
(74) Attorney, Agent, or Firm — McCarter & English, LLP

(57) ABSTRACT

A shrouded wind turbine comprises a shroud disposed about an impeller. The impeller surrounds a nacelle body which is shaped to enhance smooth flow of wind through the impeller. Some embodiments include an inlet and an outlet in the nacelle body, allowing airflow through an interior cavity. Other nacelle bodies may be tapered, flared, include mixing lobes around a trailing edge, or may have other shapes that enhance fluid flow. Some nacelle bodies include an annular groove that promotes flow attachment. Maintaining airflow attachment to the nacelle body within the turbine increases the energy generation capacity of the wind turbine.

20 Claims, 22 Drawing Sheets

(56) References Cited

U.S. PATENT DOCUMENTS

| | | | |
|---|---|---|---|
| 4,320,304 | A | 3/1982 | Karlsson et al. |
| 4,324,985 | A * | 4/1982 | Oman .......................... 290/55 |
| 4,482,290 | A | 11/1984 | Foreman et al. |
| 4,516,907 | A | 5/1985 | Edwards |
| 4,548,034 | A | 10/1985 | Maguire |
| 4,720,640 | A | 1/1988 | Anderson et al. |
| 4,781,522 | A | 11/1988 | Wolfram |
| 4,786,016 | A | 11/1988 | Presz, Jr. et al. |
| 4,830,315 | A | 5/1989 | Presz, Jr. et al. |
| 5,083,899 | A | 1/1992 | Koch |
| 5,110,560 | A | 5/1992 | Presz, Jr. et al. |
| 5,213,138 | A | 5/1993 | Presz, Jr. |
| 5,230,369 | A | 7/1993 | Presz, Jr. |
| 5,230,656 | A | 7/1993 | Paterson et al. |
| 5,327,940 | A | 7/1994 | Presz, Jr. |
| 5,440,875 | A | 8/1995 | Torkelson et al. |
| 5,447,412 | A | 9/1995 | Lamont |
| 5,464,320 | A | 11/1995 | Finney |
| 5,506,453 | A | 4/1996 | McCombs |
| 5,554,472 | A | 9/1996 | Aizawa |
| 5,761,900 | A | 6/1998 | Presz, Jr. |
| 5,836,738 | A | 11/1998 | Finney |
| 5,884,472 | A | 3/1999 | Presz, Jr. et al. |
| 5,947,678 | A | 9/1999 | Bergstein |
| 5,992,140 | A | 11/1999 | Hammond et al. |
| 6,016,651 | A | 1/2000 | Hammond et al. |
| 6,082,635 | A | 7/2000 | Seiner et al. |
| 6,127,739 | A | 10/2000 | Appa |
| 6,233,920 | B1 | 5/2001 | Presz, Jr. et al. |
| 6,276,127 | B1 | 8/2001 | Alberti |
| 6,278,197 | B1 | 8/2001 | Appa |
| 6,311,928 | B1 | 11/2001 | Presz, Jr. et al. |
| 6,382,904 | B1 | 5/2002 | Orlov et al. |
| 6,655,907 | B2 | 12/2003 | Brock et al. |
| 6,659,719 | B2 | 12/2003 | Angelis |
| 6,841,892 | B1 | 1/2005 | Le Nabour et al. |
| 6,854,260 | B2 | 2/2005 | Anderson |
| 6,877,960 | B1 | 4/2005 | Presz, Jr. et al. |
| 6,887,031 | B1 | 5/2005 | Tocher |
| 7,017,331 | B2 | 3/2006 | Anderson |
| 7,094,018 | B2 | 8/2006 | Grubb |
| 7,111,448 | B2 | 9/2006 | Anderson |
| 7,144,216 | B2 | 12/2006 | Hessel |
| D543,495 | S | 5/2007 | Williams |
| 7,218,011 | B2 | 5/2007 | Hiel et al. |
| 7,220,096 | B2 | 5/2007 | Tocher |
| 7,251,927 | B2 | 8/2007 | Anderson |
| 7,270,043 | B2 | 9/2007 | Presz, Jr. et al. |
| 7,600,963 | B2 | 10/2009 | Miller |
| 7,874,788 | B2 | 1/2011 | Stothers et al. |
| 8,021,100 | B2 | 9/2011 | Presz, Jr. et al. |
| 8,376,686 | B2 | 2/2013 | Presz, Jr. et al. |
| 2003/0137149 | A1 | 7/2003 | Northrup et al. |
| 2004/0005226 | A1 | 1/2004 | Smith, III |
| 2004/0156710 | A1 | 8/2004 | Gaskell |
| 2006/0151633 | A1 | 7/2006 | Presz, Jr. et al. |
| 2007/0018459 | A1 | 1/2007 | Williams |
| 2007/0284884 | A1 | 12/2007 | Stothers et al. |
| 2008/0232957 | A1 | 9/2008 | Presz et al. |
| 2009/0087308 | A2 | 4/2009 | Presz et al. |
| 2009/0214338 | A1 | 8/2009 | Werle et al. |

FOREIGN PATENT DOCUMENTS

| | | | |
|---|---|---|---|
| EP | 1 067 286 | A1 | 1/2001 |
| EP | 1854999 | A1 * | 11/2007 |
| EP | 1885047 | B1 | 12/2008 |
| JP | 60119384 | A * | 6/1985 |
| JP | 2003 328921 | A | 11/2003 |
| RU | 2147693 | C1 | 4/2000 |
| WO | WO 97/41351 | | 11/1997 |
| WO | WO03081031 | A1 | 2/2003 |
| WO | WO2004099607 | A2 | 11/2004 |
| WO | 2006029496 | A1 | 3/2006 |
| WO | 2009129309 | A2 | 10/2009 |

OTHER PUBLICATIONS

Future Energy Solutions, Inc.'s Wind Tamer™ Turbines video demonstration found on Future Energy Solutions, Inc.'s website http://www.windtamerturbines.com/about-wind-tamer-turbines.asp, Oct. 8, 2008, Livonia, NY.

Igra, O., "Shrouds for Aerogenerators," AIAA Journal, Oct. 1976, pp. 1481-1483. vol. 14, No. 10.

English Translation of RU 2,147,693 C1. FLS, Inc. Aug. 2010.

Hansen et al., "Effect of Placing a Diffuser Around a Wind Turbine," Wind Energy, 2000, pp. 3:207-213. (No publication month available; however, per MPEP 609.04(a), Applicant submits that the year of publication is sufficiently earlier than the effective U.S. filing date and any foreign priority date so that the particular month of publication is not in issue.).

Igra, O., "Research and Development for Shrouded Wind Turbines," Energy Cons. & Management, 1981, pp. 13-48, vol. 21. (No publication month available; however, per MPEP 609.04(a), Applicant submits that the year of publication is sufficiently earlier than the effective U.S. filing date and any foreign priority date so that the particular month of publication is not in issue.).

Werle, M.J. & Presz Jr., W. M., "Ducted Wind/Water Turbines and Propellers Revisited," Journal of Propulsion and Power, vol. 24, No. 5 (Sep. 2008), 1146-1150.

* cited by examiner

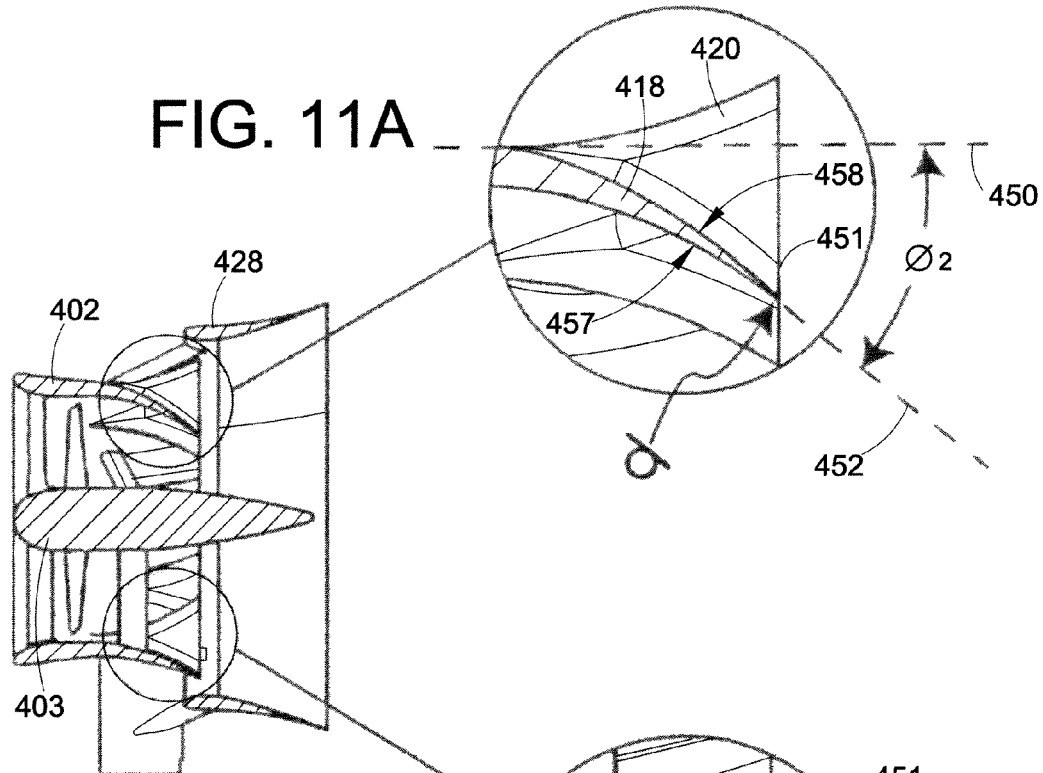
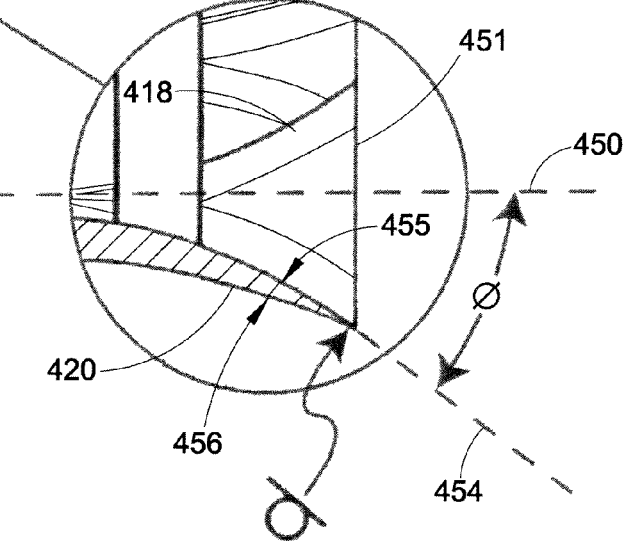
FIG. 11A
FIG. 11
FIG. 11B

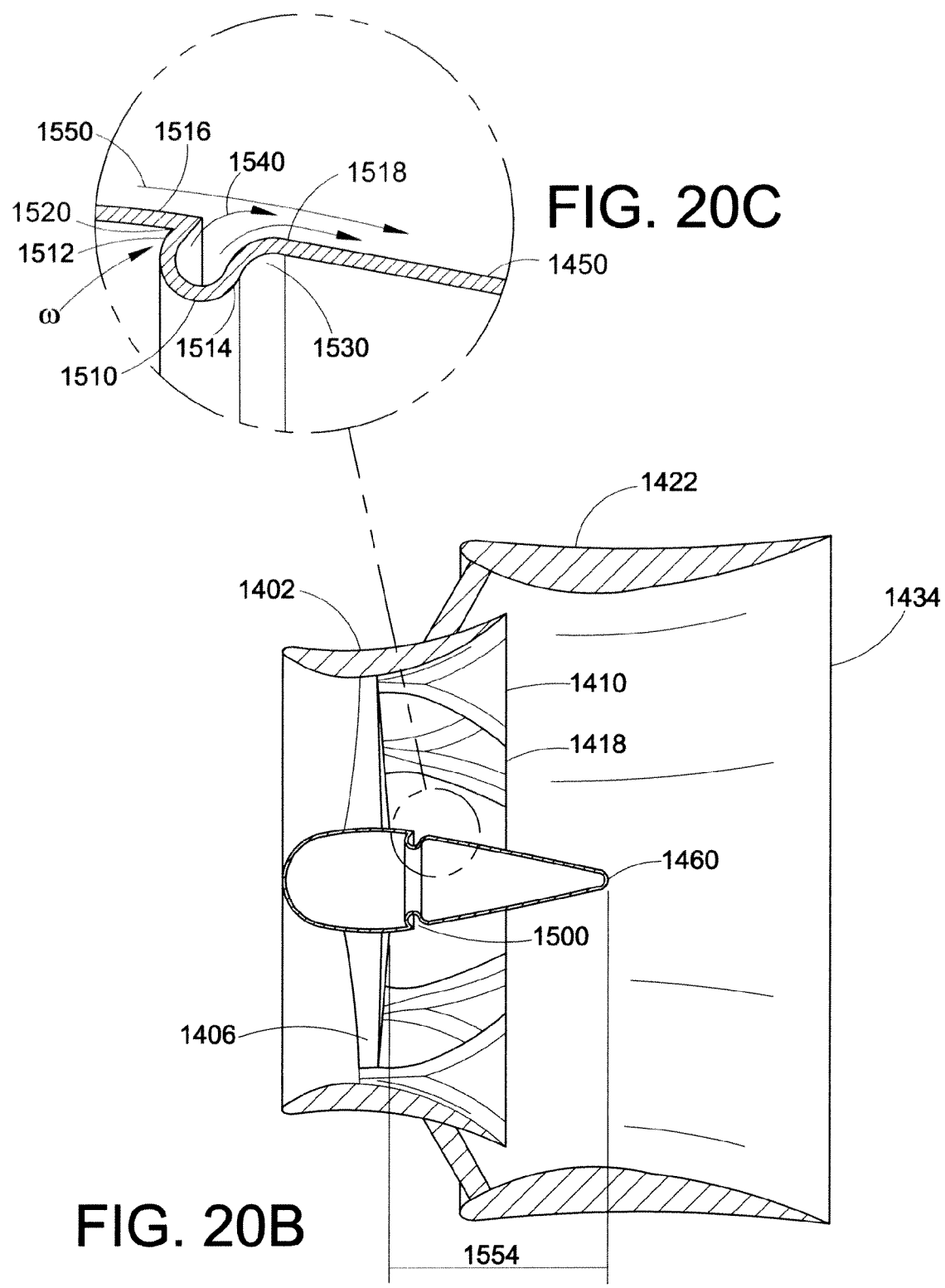

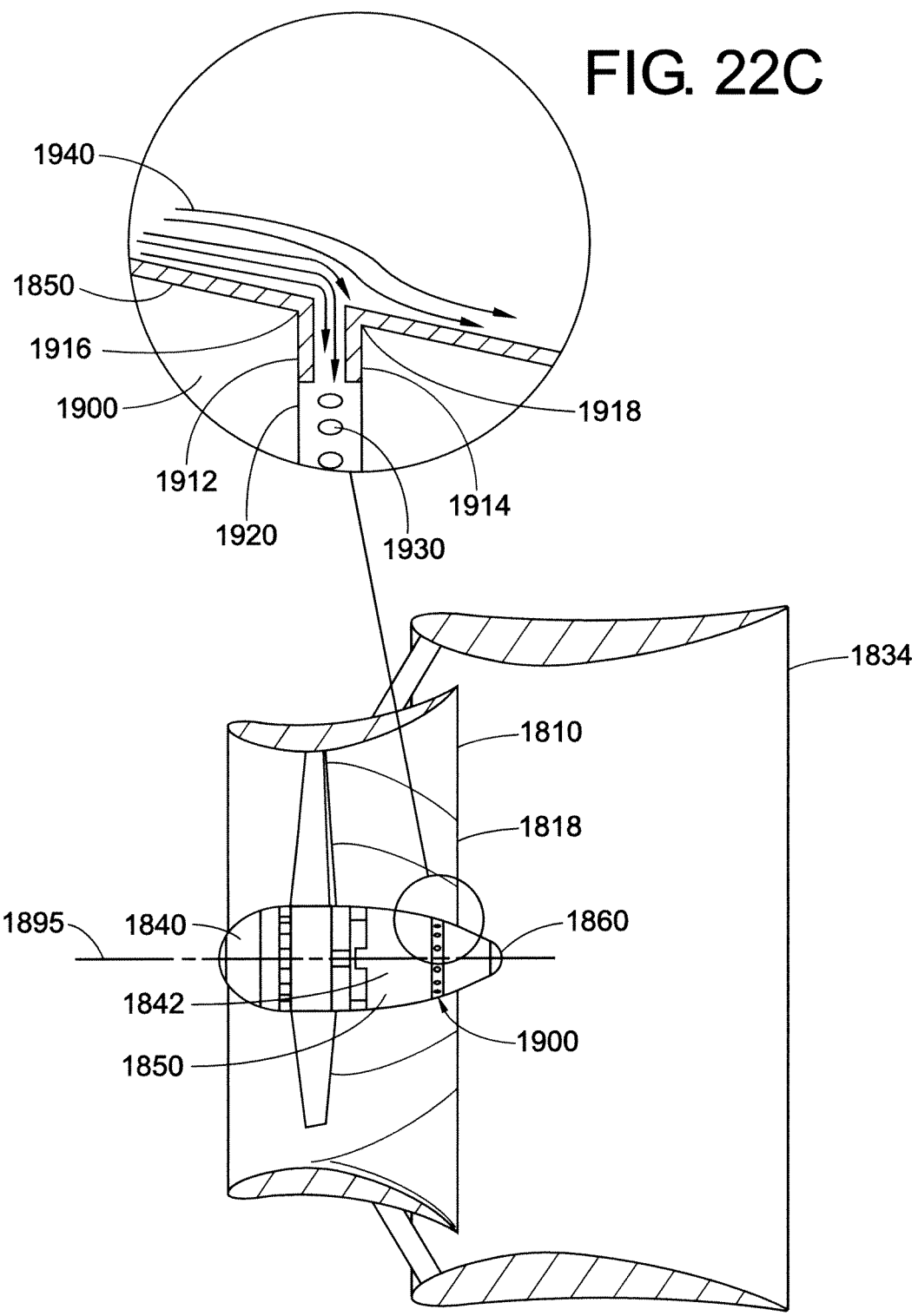

NACELLE CONFIGURATIONS FOR A SHROUDED WIND TURBINE

This application is a continuation-in-part application of U.S. patent application Ser. No. 12/054,050, filed Mar. 24, 2008, which claimed priority from U.S. Provisional Patent Application Ser. No. 60/919,588, filed Mar. 23, 2007. This application also claims priority to U.S. Provisional Patent Application Ser. No. 61/184,026, filed Jun. 4, 2009. The disclosure of these applications is hereby fully incorporated by reference in their entirety.

BACKGROUND

The present disclosure relates generally to nacelle bodies suitable for use with wind turbines. In particular, shrouded wind turbines using such nacelle configurations are described herein.

Conventional horizontal axis wind turbines (HAWTs) have 2-5 blades and are oriented or pointed into the wind by computer controlled motors. These turbines typically require a supporting tower ranging from 60 to 90 meters (200-300 feet) in height. The blades generally rotate at a rotational speed of about 10 to 22 rpm, with tip speeds reaching over 200 mph. A gear box is commonly used to step up the speed to drive the generator, although some designs may directly drive an annular electric generator. Some turbines operate at a constant speed. However, more energy can be collected by using a variable speed turbine and a solid state power converter to interface the turbine with the generator. Although HAWTs have achieved widespread usage, their efficiency is not optimized. In particular, they will not exceed 59.3% efficiency, i.e., the Betz limit, in capturing the potential energy of the wind passing through it.

Several problems are associated with HAWTs in both construction and operation. The tall towers and long blades are difficult to transport. Massive tower construction is required to support the heavy blades, gearbox, and generator. Very tall and expensive cranes and skilled operators are needed for installation. In operation, HAWTs require an additional yaw control mechanism to turn the blades toward the wind. HAWTs typically have a high angle of attack on their airfoils that do not lend themselves to variable changes in wind flow. HAWTs are difficult to operate in near ground, turbulent winds. Furthermore, ice build-up on the nacelle and the blades can cause power reduction and safety issues. Tall HAWTs may affect airport radar. Their height also makes them obtrusively visible across large areas, disrupting the appearance of the landscape, which may be objectionable. Finally, downwind variants suffer from fatigue and structural failure caused by turbulence.

The various components of the HAWT, such as the gearbox, the rotor shaft, generator, pitch and yaw controls, and brakes, are generally located within the nacelle of the HAWT. The nacelle may have dimensions such as 24 meters in length by 6 meters in height by 6 meters in width (~79 ft long×20 ft high×20 ft wide). The nacelle usually weighs at least 10 tons, and can weigh as much as 60 tons. The nacelle itself is usually made from two pieces, a bottom and a top. The bottom piece of the nacelle is anchored to the tower, the various components are placed inside the bottom piece, and the nacelle is completed by placing the top piece to cover all of the various components. The resulting outer surface of the nacelle is generally not smooth, flat, or even. The nacelle may not enhance the efficiency of energy generation in the wind turbine.

BRIEF DESCRIPTION

Disclosed herein are nacelle body configurations for use with wind turbines. An aerodynamically shaped nacelle body promotes flow attachment of wind, which increases the efficiency of energy generation and eliminates potential airflow patterns that can stagnate or stall the fluid flow through the wind turbine. The nacelle bodies are particularly suitable for use with a shrouded wind turbine.

A mixer/ejector wind turbine system (referenced herein as a "MEWT") for generating power is disclosed that combines fluid dynamic ejector concepts, advanced flow mixing and control devices, and an adjustable power turbine. In some embodiments or versions, the MEWT is an axial flow turbine comprising, in order going downstream: an aerodynamically contoured turbine shroud having an inlet; a ring of stators within the shroud; a nacelle body supporting an impeller having a ring of impeller blades "in line" with the stators; a mixer, associated with the turbine shroud, having a ring of mixing lobes extending downstream beyond the impeller blades; and an ejector comprising the ring of mixing lobes and a mixing shroud extending downstream beyond the mixing lobes. The turbine shroud, mixer and ejector are designed and arranged to draw the maximum amount of wind through the turbine and to minimize impact upon the environment (e.g., noise) and upon other power turbines in its wake (e.g., structural or productivity losses). Unlike existing wind turbines, the preferred MEWT contains a shroud with advanced flow mixing and control devices such as lobed or slotted mixers and/or one or more ejector pumps. The mixer/ejector pump presented is much different than used heretofore since in the disclosed wind turbine, the high energy air flows into the ejector inlets, and outwardly surrounds, pumps and mixes with the low energy air exiting the turbine shroud.

Also disclosed in other embodiments is a turbine comprising: a mixer shroud having an outlet and an inlet for receiving a primary fluid stream; and means for extracting energy from the primary fluid stream, the means for extracting energy being located within the turbine shroud; wherein the mixer shroud includes a set of high energy mixing lobes and a set of low energy mixing lobes; wherein each high energy mixing lobe forms an angle in the range of about 5 to 65 degrees relative to the mixer shroud; and wherein each low energy mixing lobe forms an angle in the range of about 5 to 65 degrees relative to the mixer shroud or the turbine axis.

The high energy mixing lobe angle may be different from, greater than, less than, or equal to the low energy mixing lobe angle.

The turbine may further comprise an ejector shroud downstream from and coaxial with the mixer shroud, wherein a mixer shroud outlet extends into an ejector shroud inlet. The ejector shroud may itself have a ring of mixer lobes around its outlet.

The means for extracting energy may be an impeller or a rotor/stator assembly.

Disclosed in embodiments is a shrouded horizontal axis wind turbine which comprises an impeller, a turbine shroud surrounding the impeller, and a nacelle body. The turbine shroud has an exterior surface and comprises a plurality of mixing lobes formed on a trailing edge. The trailing edge also defines a turbine shroud outlet end. The nacelle body has one or more inlet openings on a leading surface allowing fluid to flow into an interior cavity. One or more outlet openings are present on a trailing surface of the nacelle body and lead from the interior cavity. The trailing surface is located downstream of the turbine shroud outlet end.

The impeller may be a rotor/stator assembly. Stator vanes engage the turbine shroud. Rotor blades are rotationally engaged and coaxial with the nacelle body. The impeller may also be a propeller.

The turbine may further comprise an ejector shroud downstream from and coaxial with the turbine shroud. The turbine shroud outlet end extends into an ejector shroud inlet end. The ejector shroud may also have a ring of mixing lobes form on a trailing edge, i.e. around an outlet end.

The trailing surface of the nacelle body can be located downstream of the ejector shroud outlet end. The trailing surface of the nacelle body can alternatively be located upstream of the ejector shroud outlet end.

In some embodiments, the nacelle body has a constant diameter along a length of the nacelle body downstream of the leading surface.

The nacelle body may further comprise a front portion, a central portion, and a rear portion. The front portion has a first diameter. The central portion extends from the front portion to the rear portion and has a second diameter less than the first diameter. The rear portion has a third diameter greater than the second diameter. The rear portion may also comprise mixing lobes formed thereon.

Disclosed in other embodiments is a shrouded horizontal axis wind turbine comprising an impeller, a turbine shroud surrounding the impeller, and a nacelle body. The turbine shroud comprises a plurality of mixing lobes located along a trailing edge. The trailing edge also defines a turbine shroud outlet end. The nacelle body has a leading surface, a front portion with a first diameter, a central portion located downstream of the front portion and having a second diameter, a rear portion located downstream of the central portion and having a third diameter, and a trailing surface located downstream of the turbine shroud outlet end.

The turbine may further comprise an ejector shroud downstream from and coaxial with the turbine shroud. The turbine shroud outlet end extends into an ejector shroud inlet end. The ejector shroud may have a ring of mixer lobes formed on a trailing edge, or in other words around the outlet end of the ejector shroud.

The trailing surface of the nacelle body can be located downstream of the ejector shroud outlet end. The trailing surface of the nacelle body can be located upstream of the ejector shroud outlet end.

In some embodiments, the second diameter is less than the first diameter, and the third diameter is greater than the second diameter. In other embodiments, the first diameter, the second diameter and third diameter are approximately equal.

The rear portion may have a ring of mixing lobes formed thereon.

In some embodiments, the rear portion of the nacelle body has a fourth diameter downstream of the third diameter. The fourth diameter is less than the third diameter.

Disclosed in other embodiments is a shrouded horizontal axis wind turbine which comprises an impeller, a turbine shroud surrounding the impeller, and a nacelle body. The turbine shroud has an exterior surface and comprises a plurality of mixing lobes located along a trailing edge. The trailing edge also defines a turbine shroud outlet end. The nacelle body has a leading surface, a front portion with a first diameter, a central portion located downstream of the front portion and having a second diameter, and a rear portion located downstream of the central portion and having a third diameter. An annular groove is present in the nacelle body downstream of the impeller.

Also described in embodiments is a shrouded horizontal axis wind turbine comprising an impeller, a turbine shroud surrounding the impeller, and a nacelle body. The turbine shroud has mixing lobes formed on a trailing edge thereof, and the trailing edge defining a turbine shroud outlet end. The nacelle body comprises a leading surface, an exterior surface downstream of the impeller, and an annular groove in the exterior surface.

In some embodiments, the annular groove may comprise an arcuate cross section having a downstream point and an upstream point. A first lip connects the upstream point to an exterior surface of the nacelle body. The first lip has an acute angle. A second lip connects the downstream point to the exterior surface of the nacelle body.

In other embodiments, a cross-sectional view of the annular groove comprises an upstream side and a downstream side joined by a base. The upstream side and downstream side are perpendicular to the central axis of the nacelle body. A plurality of axial inlets is present in the base.

In some embodiments, the second diameter is less than the first diameter, and the third diameter is greater than the second diameter.

The turbine may further comprise an ejector shroud downstream from and coaxial with the turbine shroud, wherein the turbine shroud outlet end extends into an ejector shroud inlet end. The ejector shroud may have a ring of mixer lobes around an outlet end.

These and other non-limiting features or characteristics of the present disclosure will be further described below.

BRIEF DESCRIPTION OF THE DRAWINGS

The following is a brief description of the drawings, which are presented for the purposes of illustrating the disclosure set forth herein and not for the purposes of limiting the same.

FIG. 11 is a smaller view of FIG. 10.

FIG. 11A and FIG. 11B are magnified views of the mixing lobes of the MEWT of FIG. 9.

FIG. 20B is a side cross-sectional view of the wind turbine of FIG. 20A.

FIG. 20C is an enlarged view of the annular groove in FIG. 20B.

FIG. 22B is a side cross-sectional view of the wind turbine of FIG. 22A.

FIG. 22C is an enlarged view of the annular groove in FIG. 22B.

DETAILED DESCRIPTION

Figure 1:
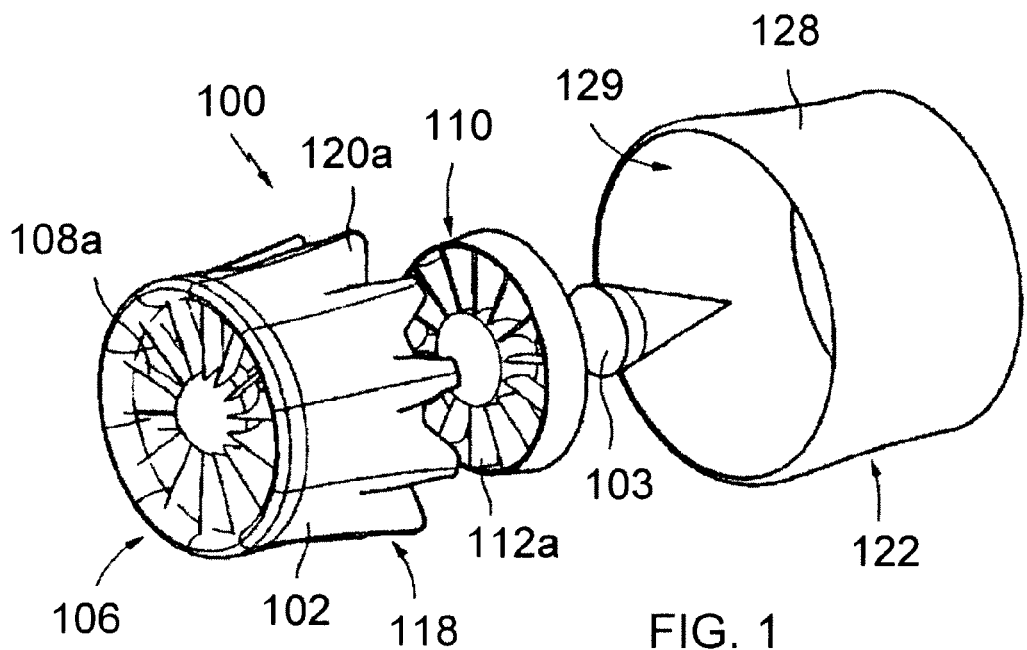
FIG. 1 is an exploded view of a first exemplary embodiment or version of a MEWT of the present disclosure.

A more complete understanding of the components, processes, and apparatuses disclosed herein can be obtained by reference to the accompanying figures. These figures are merely schematic representations based on convenience and the ease of demonstrating the present development and are, therefore, not intended to indicate the relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range from 2 to 4."

A Mixer-Ejector Power System (MEPS) provides a unique and improved means of generating power from wind currents. A MEPS includes:

a primary shroud containing a turbine or bladed impeller, similar to a propeller, which extracts power from the primary stream; and a single or multiple-stage mixer-ejector to ingest flow with each such mixer/ejector stage including a mixing duct for both bringing in secondary flow and providing flow mixing-length for the ejector stage. The inlet contours of the mixing duct or shroud are designed to minimize flow losses while providing the pressure forces necessary for good ejector performance.

The resulting mixer/ejectors enhance the operational characteristics of the power system by: (a) increasing the amount of flow through the system, (b) reducing the exit or back pressure on the turbine blades, and (c) reducing the noise propagating from the system.

The MEPS may include:

camber to the duct profiles to enhance the amount of flow into and through the system;

acoustical treatment in the primary and mixing ducts for noise abatement flow guide vanes in the primary duct for control of flow swirl and/or mixer-lobes tailored to diminish flow swirl effects;

turbine-like blade aerodynamics designs based on the new theoretical power limits to develop families of short, structurally robust configurations which may have multiple and/or counter-rotating rows of blades;

exit diffusers or nozzles on the mixing duct to further improve performance of the overall system;

inlet and outlet areas that are non-circular in cross section to accommodate installation limitations;

a swivel joint on its lower outer surface for mounting on a vertical stand/pylon allowing for turning the system into the wind;

vertical aerodynamic stabilizer vanes mounted on the exterior of the ducts with tabs or vanes to keep the system pointed into the wind; or mixer lobes on a single stage of a multi-stage ejector system.

Referring to the drawings in detail, the figures illustrate alternate embodiments of Applicants' axial flow Wind Turbine with Mixers and Ejectors ("MEWT").

Figure 2:
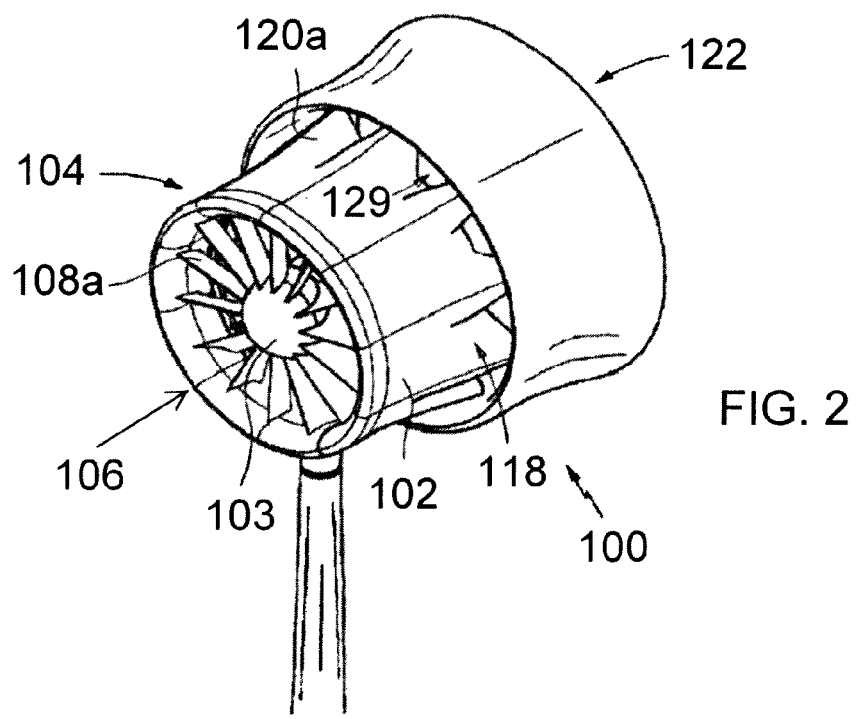
FIG. 2 is a front perspective view of FIG. 1 attached to a support tower.

Referring to FIG. 1 and FIG. 2, the MEWT 100 is an axial flow turbine with:

a) an aerodynamically contoured turbine shroud 102;

b) an aerodynamically contoured center body 103 within and attached to the turbine shroud 102;

c) a turbine stage 104, surrounding the center body 103, comprising a stator ring 106 having stator vanes 108a and a rotor 110 having rotor blades 112a. Rotor 110 is downstream and "in-line" with the stator vanes, i.e., the leading edges of the impeller blades are substantially aligned with trailing edges of the stator vanes, in which:
  i) the stator vanes 108a are mounted on the center body 103;
  ii) the rotor blades 112a are attached and held together by inner and outer rings or hoops mounted on the center body 103;
d) a mixer indicated generally at 113B having a ring of mixer lobes 120a on a terminus region (i.e., end portion) of the turbine shroud 102, wherein the mixer lobes 120a extend downstream beyond the rotor blades 112a; and,
e) an ejector indicated generally at 122 comprising an ejector shroud 128, surrounding the ring of mixer lobes 120a on the turbine shroud, wherein the mixer lobes (e.g., 120a) extend downstream and into an inlet 129 of the ejector shroud 128.

The center body 103 of MEWT 100, as shown in FIG. 2, is desirably connected to the turbine shroud 102 through the stator ring 106, or other means. This construction serves to eliminate the damaging, annoying and long distance propagating low-frequency sound produced by traditional wind turbines as the wake from the turbine blades strike the support tower. The aerodynamic profiles of the turbine shroud 102 and ejector shroud 128 are aerodynamically cambered to increase flow through the turbine rotor.

Applicants have calculated, for optimum efficiency, the area ratio of the ejector pump 122, as defined by the ejector shroud 128 exit area over the turbine shroud 102 exit area, will be in the range of 1.5-3.0. The number of mixer lobes 120a would be between 6 and 14. Each lobe will have inner and outer trailing edge angles between 5 and 65 degrees. These angles are measured from a tangent line that is drawn at the exit of the mixing lobe down to a line that is parallel to the center axis of the turbine, as will be explained further herein. The primary lobe exit location will be at, or near, the entrance location or inlet 129 of the ejector shroud 128. The height-to-width ratio of the lobe channels will be between 0.5 and 4.5. The mixer penetration will be between 50% and 80%. The center body 103 plug trailing edge angles will be thirty degrees or less. The length to diameter (L/D) of the overall MEWT 100 will be between 0.5 and 1.25.

First-principles-based theoretical analysis of the preferred MEWT 100, performed by Applicants, indicate the MEWT can produce three or more times the power of its un-shrouded counterparts for the same frontal area; and, the MEWT 100 can increase the productivity of wind farms by a factor of two or more. Based on this theoretical analysis, it is believed the MEWT embodiment 100 will generate three times the existing power of the same size conventional open blade wind turbine.

A satisfactory embodiment 100 of the MEWT comprises: an axial flow turbine (e.g., stator vanes and impeller blades) surrounded by an aerodynamically contoured turbine shroud 102 incorporating mixing devices in its terminus region (i.e., end portion); and a separate ejector shroud 128 overlapping, but aft, of turbine shroud 102, which itself may incorporate mixer lobes in its terminus region. The ring 113B of mixer lobes 120a combined with the ejector shroud 128 can be thought of as a mixer/ejector pump. This mixer/ejector pump provides the means for consistently exceeding the Betz limit for operational efficiency of the wind turbine. The stator vanes' exit-angle incidence may be mechanically varied in situ (i.e., the vanes are pivoted) to accommodate variations in the fluid stream velocity so as to assure minimum residual swirl in the flow exiting the rotor.

Described differently, the MEWT 100 comprises a turbine stage 104 with a stator ring 106 and a rotor 110 mounted on center body 103, surrounded by turbine shroud 102 with embedded mixer lobes 120a having trailing edges inserted slightly in the entrance plane of ejector shroud 128. The turbine stage 104 and ejector shroud 128 are structurally connected to the turbine shroud 102, which is the principal load carrying member.

These figures depict a rotor/stator assembly for generating power. The term "impeller" is used herein to refer generally to any assembly in which blades are attached to a shaft and able to rotate, allowing for the generation of power or energy from wind rotating the blades. Exemplary impellers include a propeller or a rotor/stator assembly. Any type of impeller may be enclosed within the turbine shroud 102 in the wind turbine of the present disclosure.

In some embodiments, the length of the turbine shroud 102 is equal or less than the turbine shroud's outer maximum diameter. Also, the length of the ejector shroud 128 is equal or less than the ejector shroud's outer maximum diameter. The exterior surface of the center body 103 is aerodynamically contoured to minimize the effects of flow separation downstream of the MEWT 100. It may be configured to be longer or shorter than the turbine shroud 102 or the ejector shroud 128, or their combined lengths.

The turbine shroud's entrance area and exit area will be equal to or greater than that of the annulus occupied by the turbine stage 104, but need not be circular in shape so as to allow better control of the flow source and impact of its wake. The internal flow path cross-sectional area formed by the annulus between the center body 103 and the interior surface of the turbine shroud 102 is aerodynamically shaped to have a minimum area at the plane of the turbine and to otherwise vary smoothly from their respective entrance planes to their exit planes. The turbine and ejector shrouds' external surfaces are aerodynamically shaped to assist guiding the flow into the turbine shroud inlet, eliminating flow separation from their surfaces, and delivering smooth flow into the ejector entrance 129. The ejector 128 entrance area, which may alternatively be noncircular in shape, is greater than the mixer 113B exit plane area; and the ejector's exit area may also be noncircular in shape if desired.

Optional features of the preferred embodiment 100 can include: a power take-off, in the form of a wheel-like structure, which is mechanically linked at an outer rim of the impeller to a power generator; a vertical support shaft with a rotatable coupling for rotatably supporting the MEWT, the shaft being located forward of the center-of-pressure location on the MEWT for self-aligning the MEWT; and a self-moving vertical stabilizer fin or "wing-tab" affixed to upper and lower surfaces of the ejector shroud to stabilize alignment directions with different wind streams.

The MEWT 100, when used near residences can have sound absorbing material affixed to the inner surface of its shrouds 102, 128 to absorb and thus eliminate the relatively high frequency sound waves produced by the interaction of the stator 106 wakes with the rotor 110. The MEWT 100 can also contain blade containment structures for added safety. The MEWT should be considered to be a horizontal axis wind turbine as well.

Figure 3:
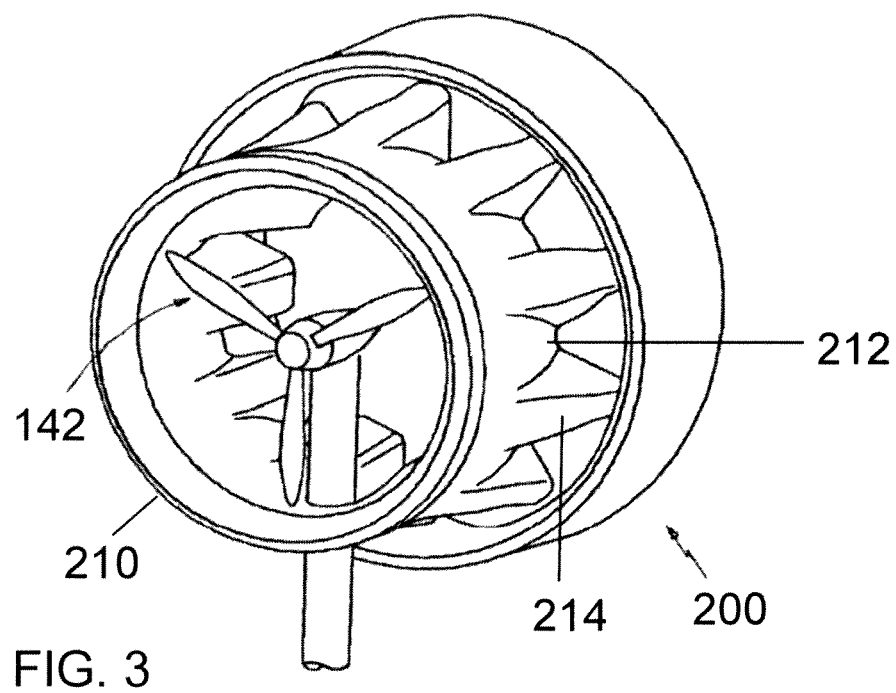
FIG. 3 is a front perspective view of a second exemplary embodiment of a MEWT, shown with a shrouded three bladed impeller.
Figure 4:
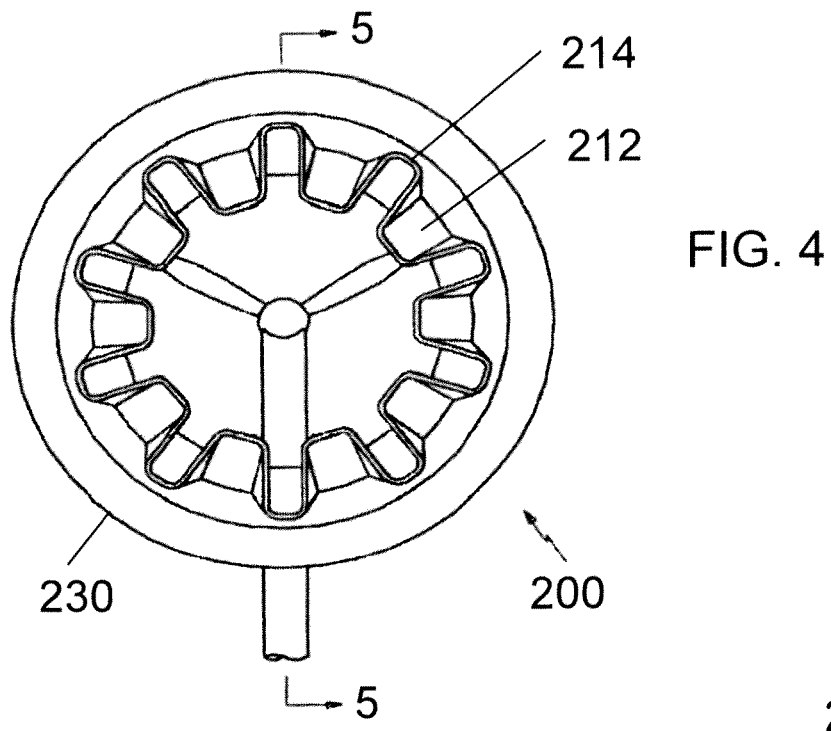
FIG. 4 is a rear view of the MEWT of FIG. 3.
Figure 5:
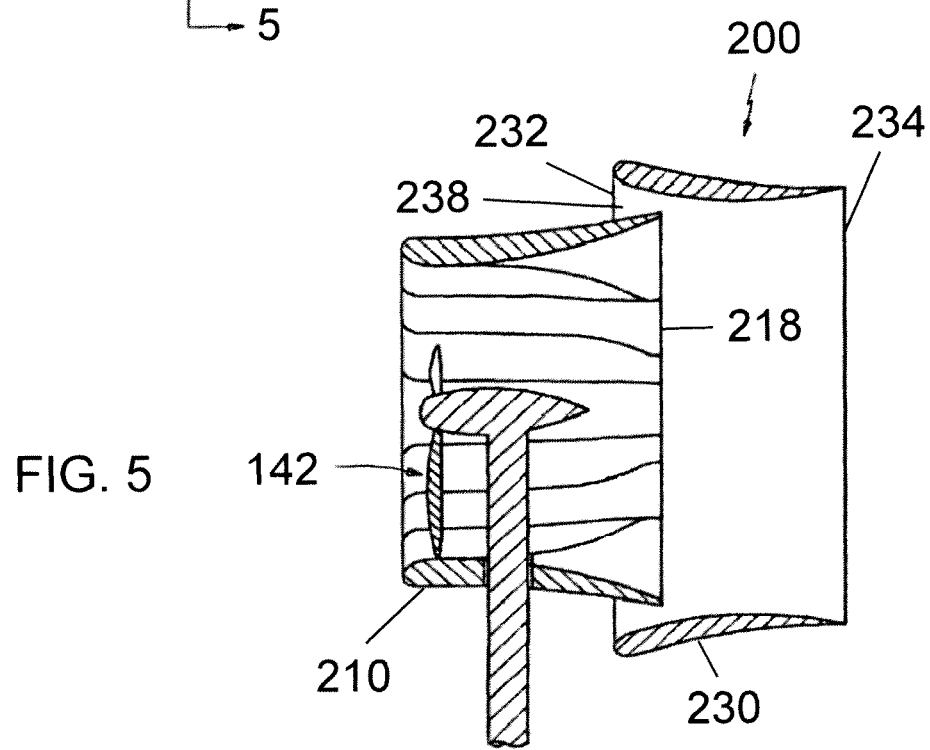
FIG. 5 is a cross-sectional view taken along line 5-5 of FIG. 4.

FIGS. 3-5 show a second exemplary embodiment of a shrouded wind turbine 200. The turbine 200 uses a propeller-type impeller 142 instead of the rotor/stator assembly as in FIG. 1 and FIG. 2. In addition, the mixing lobes can be more clearly seen in this embodiment. The turbine shroud 210 has two different sets of mixing lobes. Referring to FIG. 3 and FIG. 4, the turbine shroud 210 has a set of high energy mixing lobes 212 that extend inwards toward the central axis of the turbine. In this embodiment, the turbine shroud is shown as having 10 high energy mixing lobes. The turbine shroud also has a set of low energy mixing lobes 214 that extend outwards away from the central axis. Again, the turbine shroud 210 is shown with 10 low energy mixing lobes. The high energy mixing lobes alternate with the low energy mixing lobes around the trailing edge of the turbine shroud 210. From the rear, as seen in FIG. 4, the trailing edge of the turbine shroud may be considered as having a circular crenellated shape. The term "crenellated" or "castellated" refers to this general up-and-down or in-and-out shape of the trailing edge.

As seen in FIG. 5, the entrance area 232 of the ejector shroud 230 is larger than the exit area 234 of the ejector shroud. It will be understood that the entrance area refers to the entire mouth of the ejector shroud and not the annular area of the ejector shroud between the ejector shroud 230 and the turbine shroud 210. However, as seen further herein, the entrance area of the ejector shroud may also be smaller than the exit area 234 of the ejector shroud. As expected, the entrance area 232 of the ejector shroud 230 is larger than the exit area 213B of the turbine shroud 210, in order to accommodate the mixing lobes and to create an annular area 238 between the turbine shroud and the ejector shroud through which high energy air can enter the ejector.

The mixer-ejector design concepts described herein can significantly enhance fluid dynamic performance. These mixer-ejector systems provide numerous advantages over conventional systems, such as: shorter ejector lengths; increased mass flow into and through the system; lower sensitivity to inlet flow blockage and/or misalignment with the principal flow direction; reduced aerodynamic noise; added thrust; and increased suction pressure at the primary exit.

Figure 6:
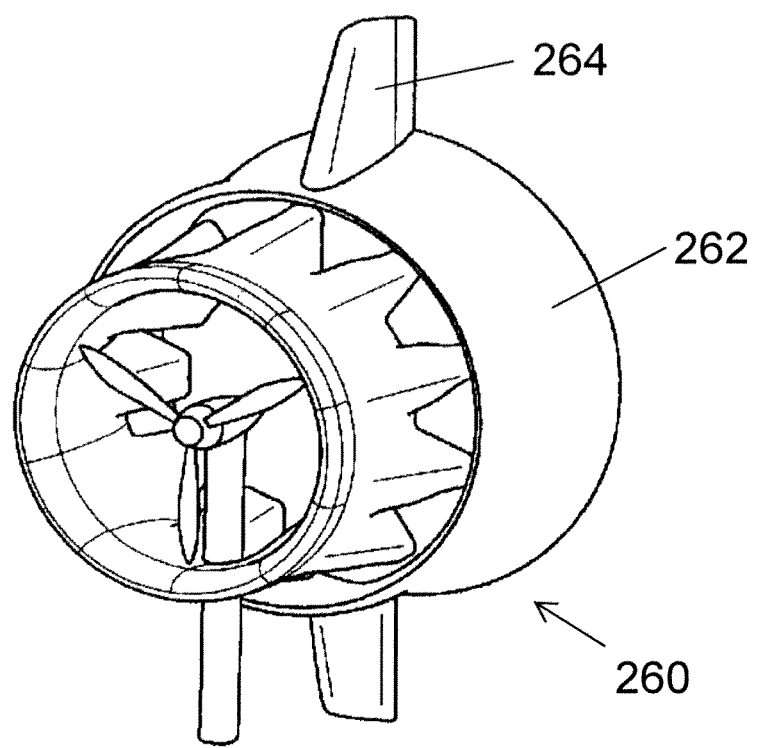
FIG. 6 is a perspective view of another exemplary embodiment of a wind turbine of the present disclosure having a pair of wing-tabs for wind alignment.

As shown in FIG. 6, another exemplary embodiment of a wind turbine 260 may have an ejector shroud 262 that has internal ribs shaped to provide wing-tabs or fins 264. The wing-tabs or fins 264 are oriented to facilitate alignment of the wind turbine 260 with the incoming wind flow to improve energy or power production.

Figure 7:
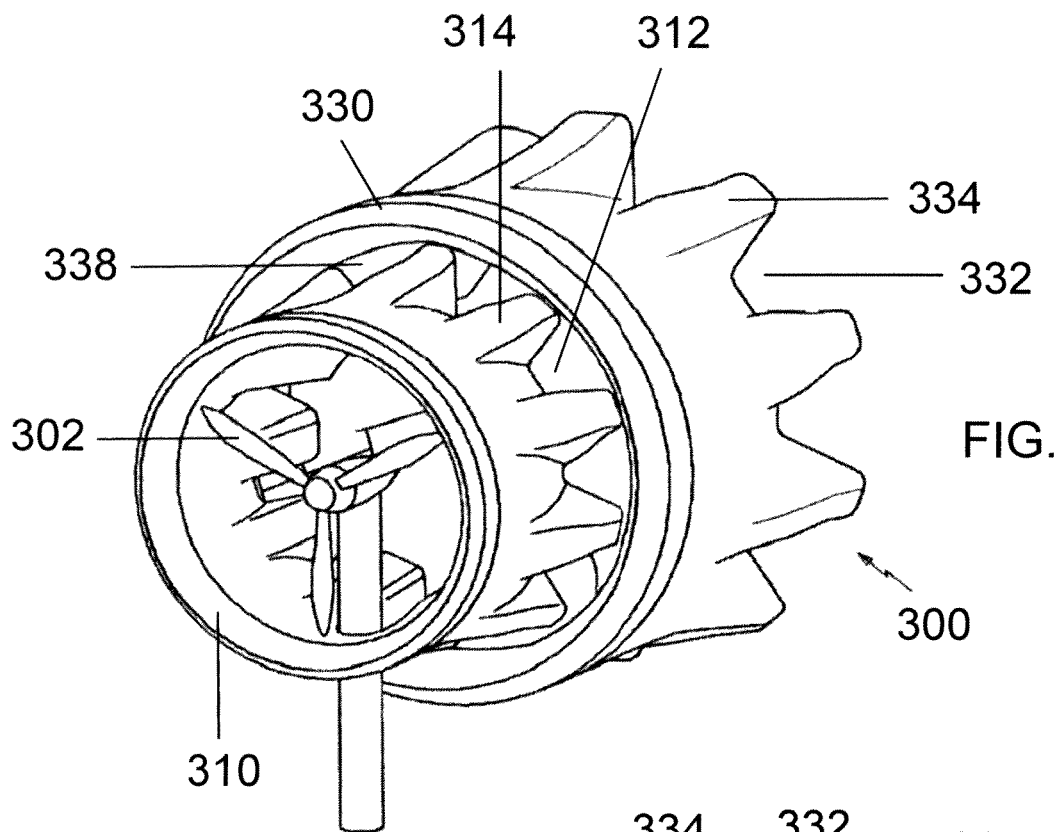
FIG. 7 is a front perspective view of another exemplary embodiment of a MEWT of the present disclosure. Here, both the turbine shroud and the ejector shroud have mixing lobes on their trailing edges.
Figure 8:
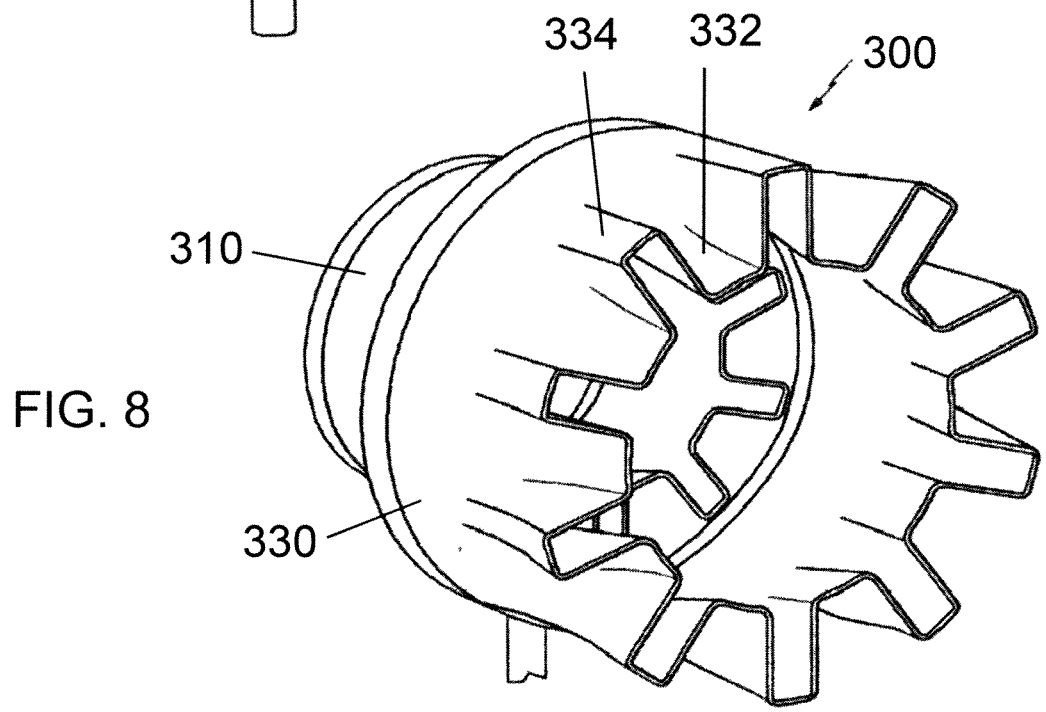
FIG. 8 is a rear perspective view of the MEWT of FIG. 7.

FIG. 7 and FIG. 8 illustrate another exemplary embodiment of a MEWT. The turbine 400 again uses a propeller-type impeller 302. The turbine shroud 310 has two different sets of mixing lobes. A set of high energy mixing lobes 312 extend inwards toward the central axis of the turbine. A set of low energy mixing lobes 314 extend outwards away from the central axis. In addition, the ejector shroud 330 is provided with mixing lobes on a trailing edge thereof. Again, two different sets of mixing lobes are present. A set of high energy mixing lobes 332 extend inwards toward the central axis of the turbine. A set of low energy mixing lobes 334 extend outwards away from the central axis. As seen in FIG. 8, the ejector shroud is shown here with 10 high energy mixing lobes and 10 low energy mixing lobes. The high energy mixing lobes alternate with the low energy mixing lobes around the trailing edge of the turbine shroud 330. Again, the trailing edge of the ejector shroud may be considered as having a circular crenellated shape.

Figure 9:
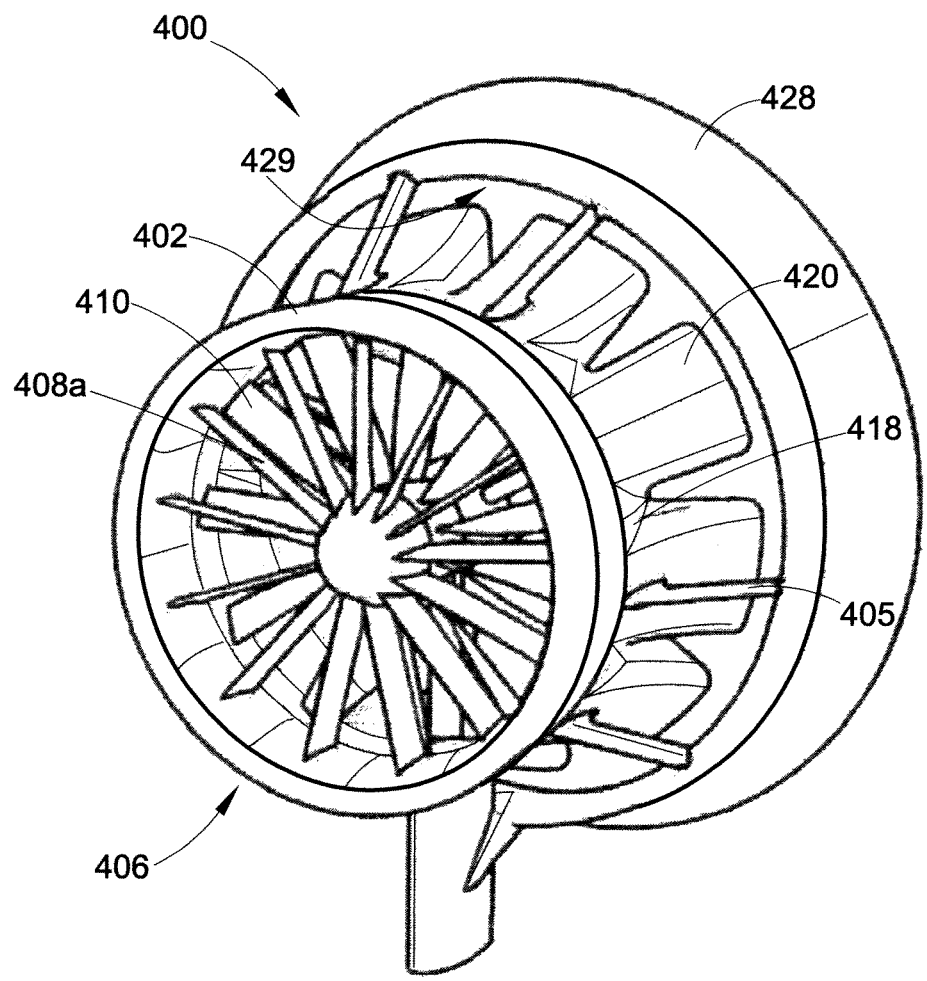
FIG. 9 is a front perspective view of another exemplary embodiment of a MEWT according to the present disclosure.
Figure 10:
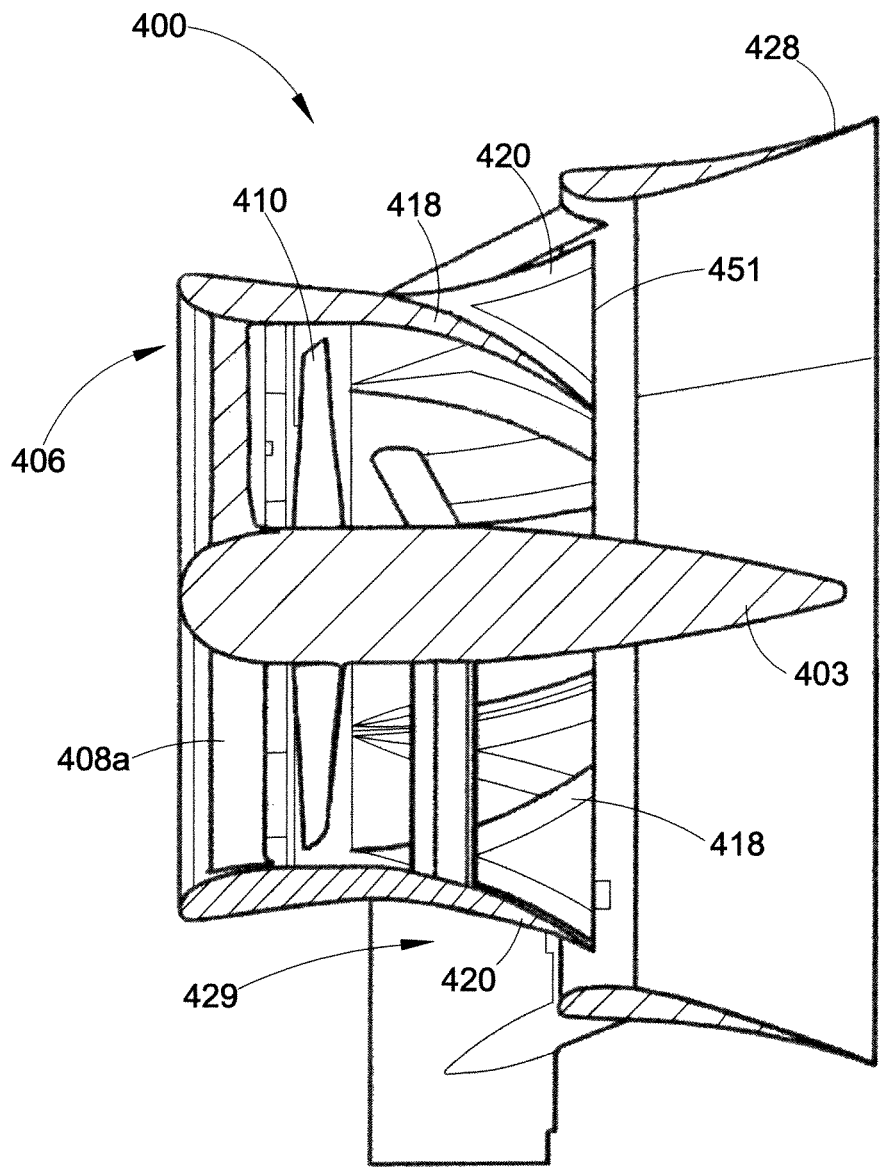
FIG. 10 is a side cross-sectional view of the MEWT of FIG. 9 taken through the turbine axis.

FIGS. 9-11 illustrate another exemplary embodiment of a MEWT. The MEWT 400 in FIG. 9 has a stator 408a and rotor 410 configuration for power extraction. A turbine shroud 402 surrounds the rotor 410 and is supported by or connected to the blades or spokes of the stator 408a. The turbine shroud 402 has the cross-sectional shape of an airfoil with the suction side (i.e. low pressure side) on the interior of the shroud. An ejector shroud 428 is coaxial with the turbine shroud 402 and is supported by connector members 405 extending between the two shrouds. An annular area is thus formed between the two shrouds. The rear or downstream end of the turbine shroud 402 is shaped to form two different sets of mixing lobes 413B, 420. High energy mixing lobes 413B extend inwardly towards the central axis of the mixer shroud 402; and low energy mixing lobes 420 extend outwardly away from the central axis.

Free stream air indicated generally by arrow 406 passing through the stator 408a has its energy extracted by the rotor 410. High energy air indicated by arrow 429 bypasses the shroud 402 and stator 408a and flows over the turbine shroud 402 and directed inwardly by the high energy mixing lobes 413B. The low energy mixing lobes 420 cause the low energy air exiting downstream from the rotor 410 to be mixed with the high energy air 429.

Referring to FIG. 10, the center nacelle 403 and the trailing edges of the low energy mixing lobes 420 and the trailing edge of the high energy mixing lobes 413B are shown in the axial cross-sectional view of the turbine of FIG. 9. The ejector shroud 428 is used to direct inwardly or draw in the high energy air 429. Optionally, nacelle 403 may be formed with a central axial passage therethrough to reduce the mass of the nacelle and to provide additional high energy turbine bypass flow.

In FIG. 11A, a tangent line 452 is drawn along the interior trailing edge indicated generally at 457 of the high energy mixing lobe 413B. A rear plane 451 of the turbine shroud 402 is present. A line 450 is formed normal to the rear plane 451 and tangent to the point where a low energy mixing lobe 420 and a high energy mixing lobe 413B meet. An angle $\phi_2$ is formed by the intersection of tangent line 452 and line 450. This angle $\phi_2$ is between 5 and 65 degrees. Put another way, a high energy mixing lobe 413B forms an angle $\phi_2$ between 5 and 65 degrees relative to the turbine shroud 402.

In FIG. 11B, a tangent line 454 is drawn along the interior trailing edge indicated generally at 455 of the low energy mixing lobe 420. An angle $\phi$ is formed by the intersection of tangent line 454 and line 450. This angle $\phi$ is between 5 and 65 degrees. Put another way, a low energy mixing lobe 420 forms an angle $\phi$ between 5 and 65 degrees relative to the turbine shroud 402.

Control of the airflow through the shrouded wind turbine enhances the efficient operation of the turbine. In particular, the aerodynamic configuration of the turbine allows for acceleration of the free stream velocity of the wind or other fluids. As the fluid flows through the shrouded wind turbine, it is preferred that the flow stays attached to the aerodynamic surfaces and flows smoothly through the wind turbine. In particular, the flow should also stay attached to the nacelle body through the turbine. Separation of the airflow from the nacelle body may cause interference with air flowing over the ringed airfoils and through the mixing lobes, leading to stagnation or stalling. This can disrupt the ability of the shrouded wind turbine to extract energy from the wind. Particular nacelle configurations can help promote flow attachment of the wind to the nacelle body throughout the turbine. Several such configurations are discussed herein.

Figure 12:
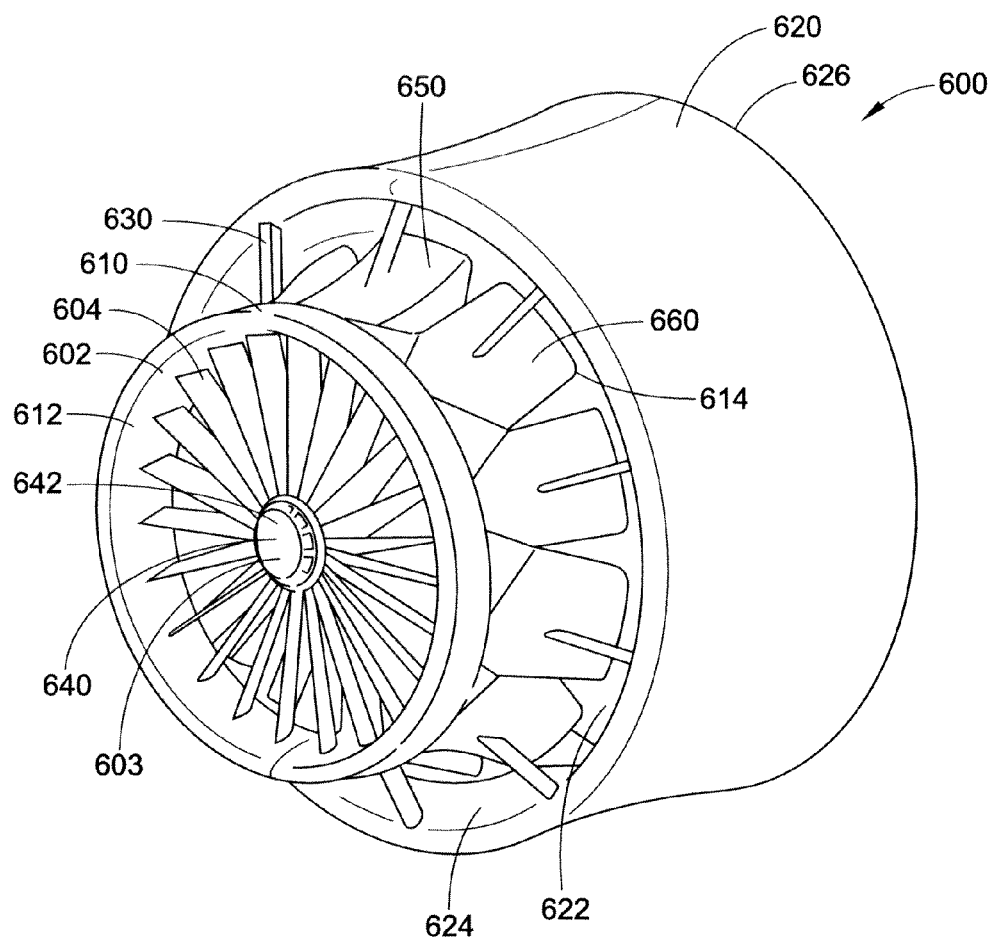
FIG. 12 is a perspective view of the front of some exemplary embodiments of a shrouded wind turbine having a nacelle body with inlet openings.

FIG. 12 is a perspective view of a shrouded wind turbine 600. A turbine shroud 602 surrounds an impeller. The impeller is shown here as a rotor/stator assembly. The impeller is rotationally engaged with and coaxial to the nacelle body 603. Stator blades 604 extend between the turbine shroud 602 and the nacelle body 603. The turbine shroud is aerodynamically contoured. An exterior surface 610 extends from a leading edge 612 of the turbine shroud to a trailing edge. Mixing lobes are formed on the trailing edge. As previously described, the mixing lobes include high-energy mixing lobes 650 and low-energy mixing lobes 660. An ejector shroud 620 is located downstream of the turbine shroud 602. The trailing edge 614 of the turbine shroud 602 extends into an inlet end 622 of the ejector shroud 620. An exterior surface extends from a leading edge 624 of the ejector shroud to a trailing edge 626 of the ejector shroud. Support members 630 extend between the turbine shroud 602 and the ejector shroud 620. Inlet openings 640 are visible on a leading surface 642 of the nacelle body 603. As seen here, the leading surface is a generally hemispherical surface.

The leading edge of the turbine shroud may be considered the front of the wind turbine, and the trailing edge of the ejector shroud may be considered the rear of the wind turbine. A first component of the wind turbine located closer to the front of the turbine may be considered "upstream" of a second component located closer to the rear of the turbine. Put another way, the second component is 'downstream' of the first component.

Figure 13A:
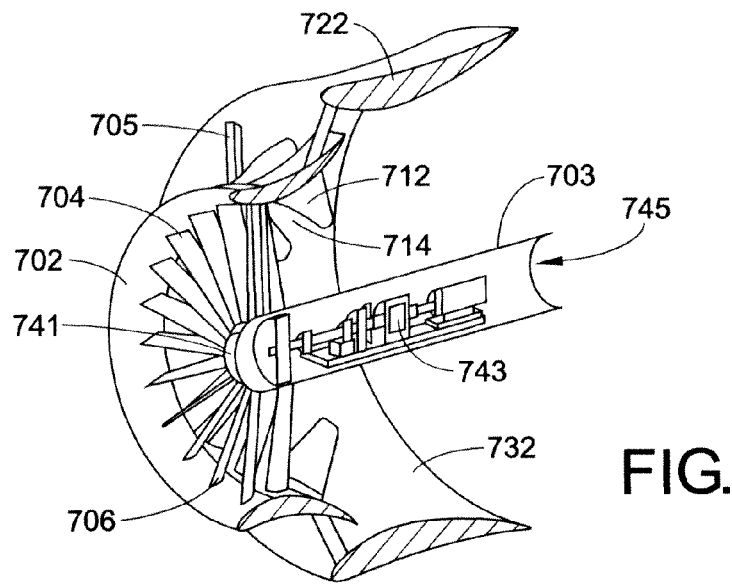
FIG. 13A is a perspective cross-sectional view of one exemplary embodiment of a wind turbine having a nacelle body with inlet openings.
Figure 13B:
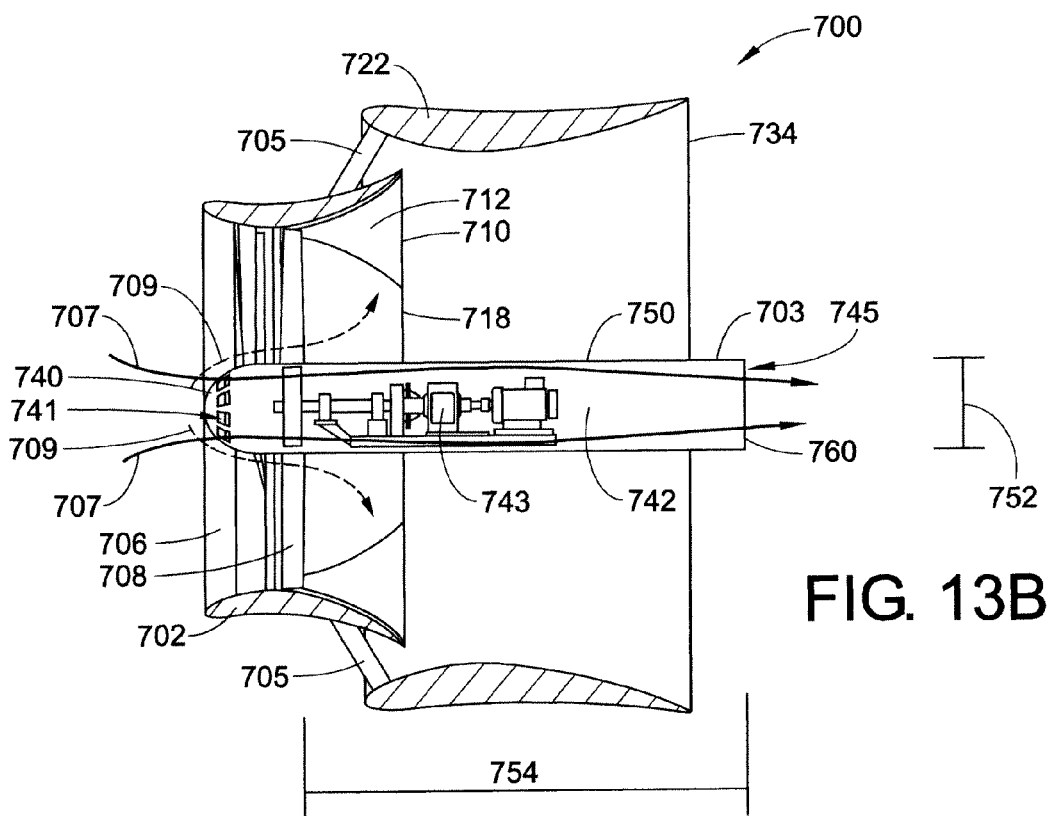
FIG. 13B is a side cross-sectional view of the wind turbine of FIG. 13A.

FIG. 13A and FIG. 13B illustrate one exemplary embodiment of a nacelle body 703. The turbine 700 comprises a turbine shroud 702, an ejector shroud 722, and a nacelle body 703. An impeller 704 is engaged with the nacelle body 703. Here, the impeller 704 is a rotor/stator assembly, and includes a ring of stator blades 706 and a ring of rotor blades 708. The turbine shroud 702, ejector shroud 722, nacelle body 703, and impeller 704 are coaxial, i.e. share a common axis. Support members 705 extend between the turbine shroud 702 and the ejector shroud 722.

A trailing edge 710 of the turbine shroud 702 has a set of high energy mixing lobes 712 that extend inwards toward a central axis of the turbine. The trailing edge 710 also has a set of low energy mixing lobes 714 that extend outwards away from the central axis. The trailing edge 710 of the turbine shroud defines a turbine shroud outlet end, as indicated by the plane having reference numeral 718. Similarly, the trailing edge 732 of the ejector shroud defines an ejector shroud outlet end, as indicated by the plane having reference numeral 734.

The nacelle body 703 has a leading surface 740, an exterior surface 750, and a trailing surface 760. The leading surface 740 generally has an aerodynamic shape, and is shown here as a hemispherical surface. The leading surface is upstream of the impeller 704. The exterior surface 750 is seen here as being generally cylindrical, with a constant diameter 752 along the entire length 754 of the nacelle body downstream of the impeller, i.e. from the impeller 704 to the trailing surface 760. The trailing surface 760 here is generally planar.

One or more inlet openings 741 are present on the leading surface 740. In embodiments, a plurality of inlet openings is present. The inlet openings 741 lead into an interior cavity 742 in the nacelle body. Generally, the nacelle body can be considered as hollow. Wind 707 can flow through the inlet openings 741 into the interior cavity 742 to cool any equipment 743 located in the interior cavity. One or more outlet openings 745 are present on the trailing surface 760 to allow the wind to exit the interior cavity. As shown here, the trailing surface is one large outlet opening. In the embodiment depicted in FIG. 13A and FIG. 13B, the trailing surface 760 is located downstream of the turbine shroud outlet end 718. The trailing surface 760 is also located downstream of the ejector shroud outlet end 734. Put another way, the length 754 of the nacelle body downstream of the impeller is sufficient to place the outlet opening(s) 745 beyond the ejector shroud trailing edge 732. This placement reduces mixing of the wind 707 in regions which may interfere with airflow through the impeller 704. The presence of the inlet openings 741 reduces the amount of air which may flow over the exterior surface 750 and subsequently separate, causing interference with high energy air entering from the high energy mixing lobes 712. This separated air is indicated with reference numeral 709.

Figure 14A:
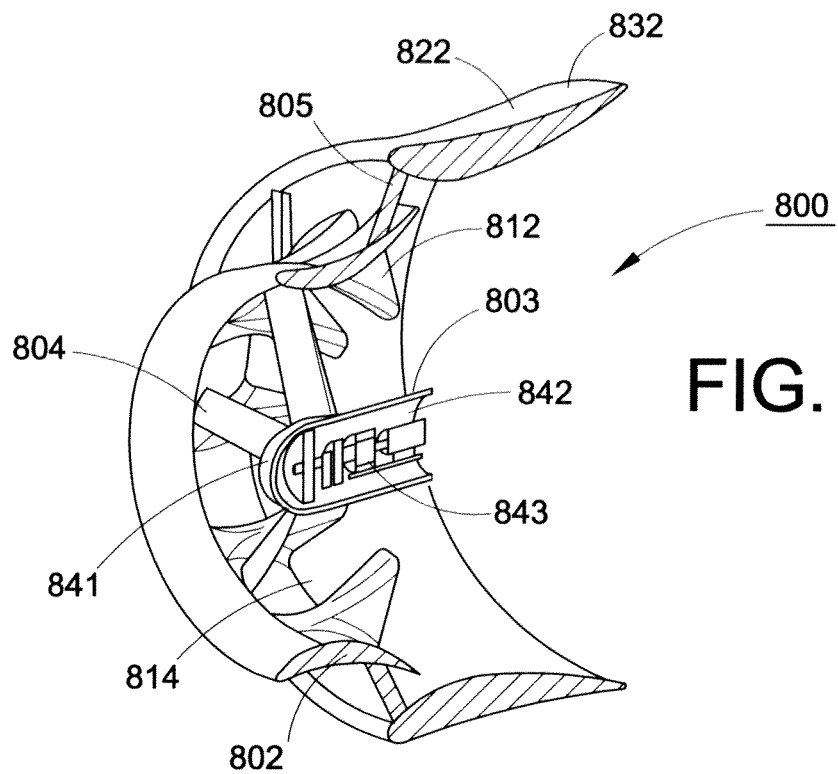
FIG. 14A is a perspective cross-sectional view of another exemplary embodiment of a wind turbine having a nacelle body with inlet openings.
Figure 14B:
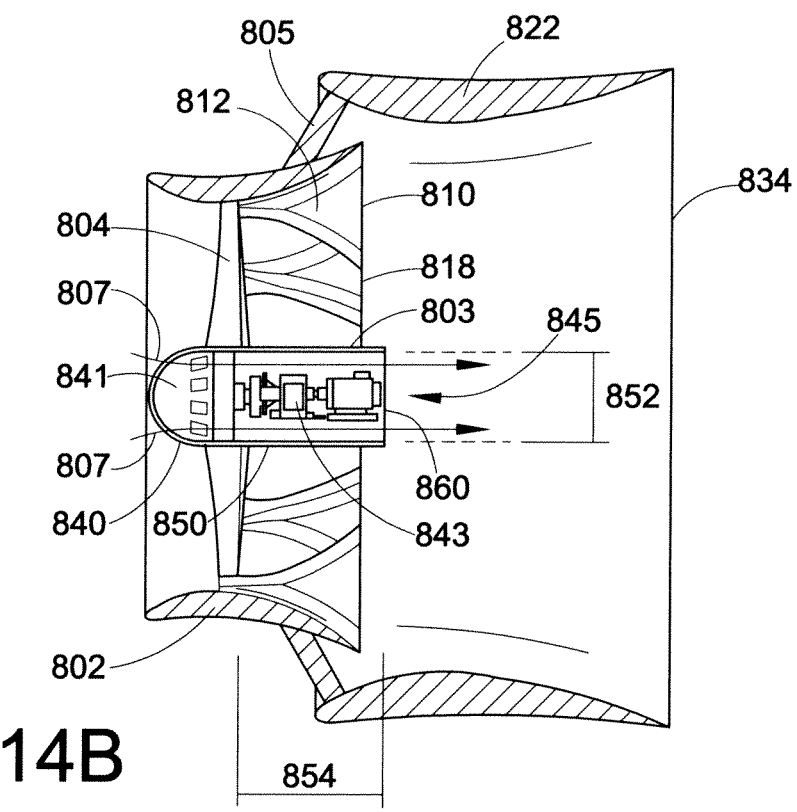
FIG. 14B is a side cross-sectional view of the wind turbine of FIG. 14A.

FIG. 14A and FIG. 14B illustrate another exemplary embodiment of a nacelle body for use with a shrouded wind turbine. The turbine 800 again comprises a turbine shroud 802, an ejector shroud 822, and a nacelle body 803. An impeller 804 is engaged with the nacelle body 803. Again, the turbine shroud 802, ejector shroud 822, nacelle body 803, and impeller 804 are coaxial. Support members 805 extend between the turbine shroud 802 and the ejector shroud 822. High energy mixing lobes 812 and low energy mixing lobes 814 are formed on a trailing edge 810 of the turbine shroud. The trailing edge 810 of the turbine shroud defines a turbine shroud outlet end 818. Similarly, the trailing edge 832 of the ejector shroud defines an ejector shroud outlet end 834.

The nacelle body 803 has a leading surface 840, an exterior surface 850, and a trailing surface 860. The exterior surface 850 has a constant diameter 852 along the length 854 of the nacelle body from the impeller 804 to the trailing surface 860. One or more inlet openings 841 are present on the leading surface 840. The inlet openings 841 lead into an interior cavity 842 in the nacelle body. Wind 807 can flow through the inlet openings 841 into the interior cavity 842 to cool the energy generation equipment 843 located in the interior cavity. One or more outlet openings 845 are present on the trailing surface 860 to allow the wind to exit the interior cavity.

The embodiment depicted here in FIG. 14B differs from the embodiment depicted in FIG. 13B in the length of the nacelle body from the impeller 804 to the trailing surface. Here, the trailing surface 860 is located upstream of the ejector shroud outlet end 834. Put another way, the length 854 of the nacelle body downstream of the impeller places the outlet opening(s) 845 within the ejector shroud 822.

Figure 15:
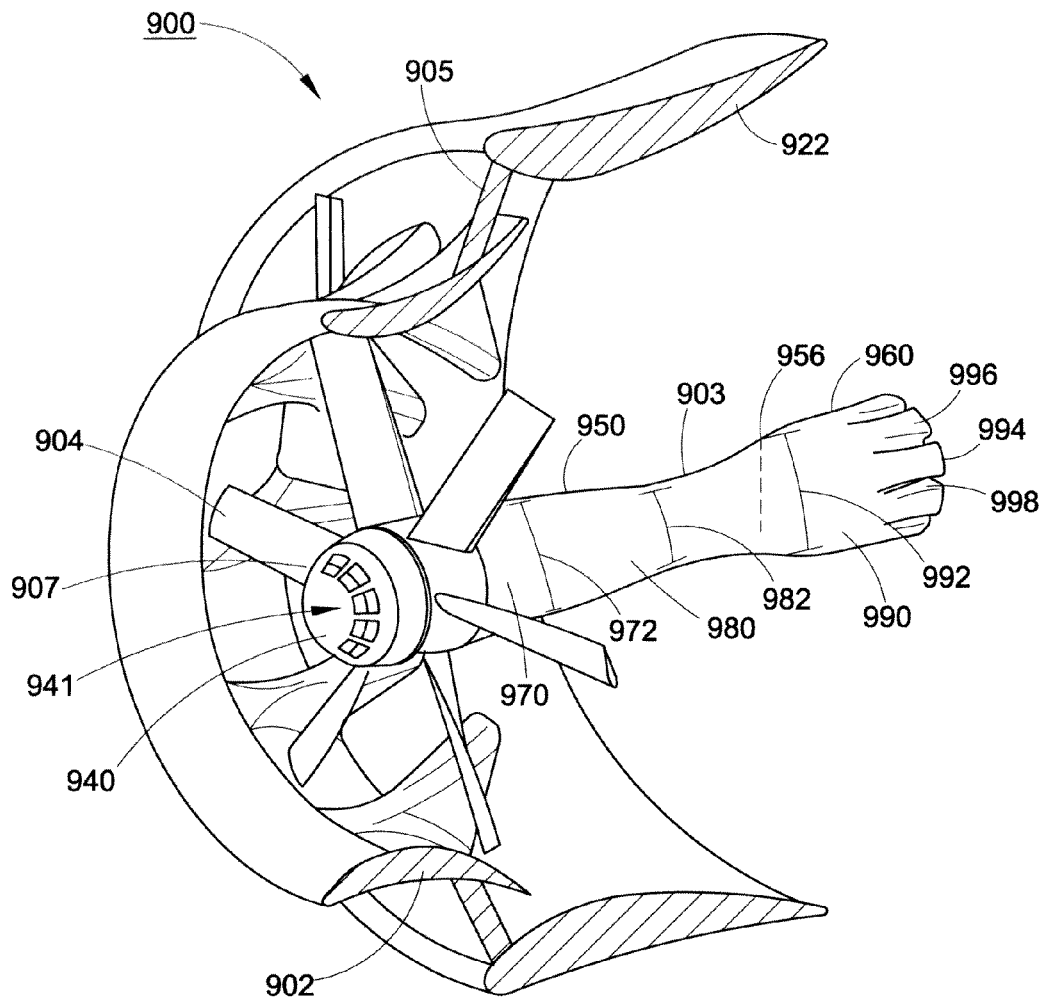
FIG. 15 is a perspective partial cross-sectional view of another exemplary embodiment of a wind turbine having a nacelle body with inlet openings. Here, the rear portion of the nacelle body has mixing lobes formed thereon.

FIG. 15 illustrates another embodiment of a nacelle body having inlet openings on the leading surface. The turbine 900 again comprises a turbine shroud 902, an ejector shroud 922, and a nacelle body 903. An impeller 904 is engaged with the nacelle body 903. The turbine shroud 902, ejector shroud 922, nacelle body 903, and impeller 904 are coaxial. Support members 905 extend between the turbine shroud 902 and the ejector shroud 922.

The nacelle body 903 has a leading surface 940, an exterior surface 950, and a trailing surface 960. One or more inlet openings 941 are present on the leading surface 940. The inlet openings 941 lead into an interior cavity (not shown) in the nacelle body. Wind 907 can flow through the inlet openings 941 into the interior cavity to cool any equipment located therein.

The nacelle body of FIG. 15 differs from that of FIG. 13B and FIG. 14B in the shape of the exterior surface 950. In this embodiment, the nacelle body may be considered as comprising a front portion 970, a central portion 980, and a rear portion 990. The front portion 970 of the nacelle body 903 extends from the impeller 904 to the central portion 980. The central portion 980 extends downstream from the front portion 970 to the rear portion 990. Put another way, the front portion 970, central portion 980, and rear portion 990 are directly connected to each other. The rear portion 990 extends downstream from the central portion 980 to the trailing surface 960.

The front portion 970 has a first diameter 972. The central portion 980 has a second diameter 982 that is less than the first diameter 972. The rear portion 990 has a third diameter 992. The third diameter 992 is greater than the second diameter 982. Generally, The third diameter can be greater than, substantially equal to, or less than the first diameter 972. This discussion of a stated diameter in a given portion of the nacelle body should not be construed to require that the entire portion have the stated diameter. For example, as seen here, the exterior surface 950 can be described as tapering between the first diameter 972 and the second diameter 982, then flaring between the second diameter 982 and the third diameter 992.

In addition, the rear portion 990 includes mixing lobes formed thereon. The trailing edge 994 of the nacelle body 903 has a circular crenellated shape and the exterior surface flows from a lobe line 956 to the trailing edge 994. A set of first mixing lobes 996 is thus formed, as well as a set of second mixing lobes 998. These mixing lobes again cause air flowing through the interior of the nacelle body to mix with air that has flowed through the impeller 904. The trailing surface 960 is one large outlet opening.

It should be noted that the turbines shown in FIG. 13B and FIG. 14B could also be considered as having a front portion, a central portion, and a rear portion. In those two figures, the first diameter, second diameter, and third diameter are substantially equal.

Figure 16A:
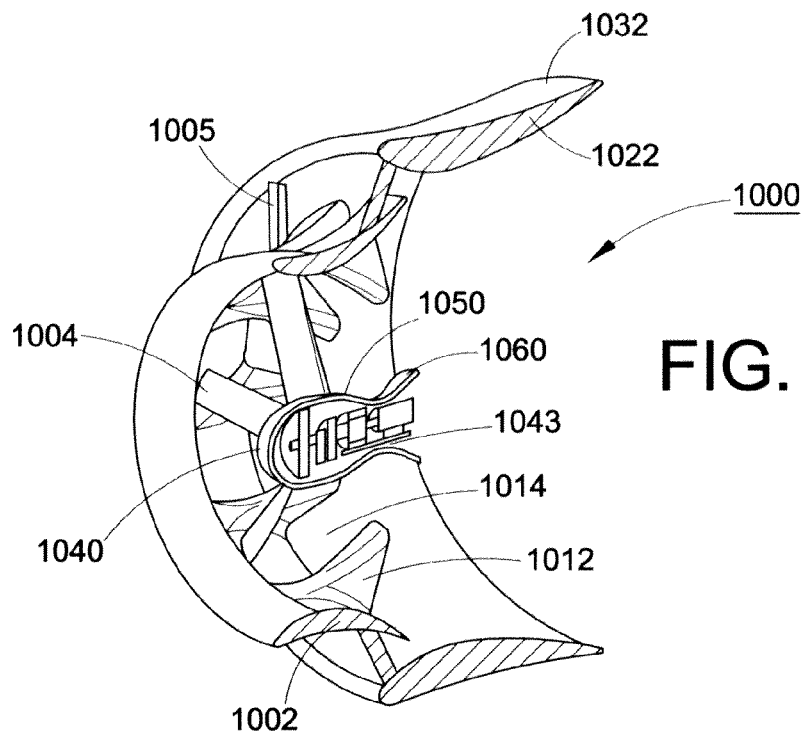
FIG. 16A is a perspective cross-sectional view of another exemplary embodiment of a wind turbine having a nacelle body with a solid leading surface.
Figure 16B:
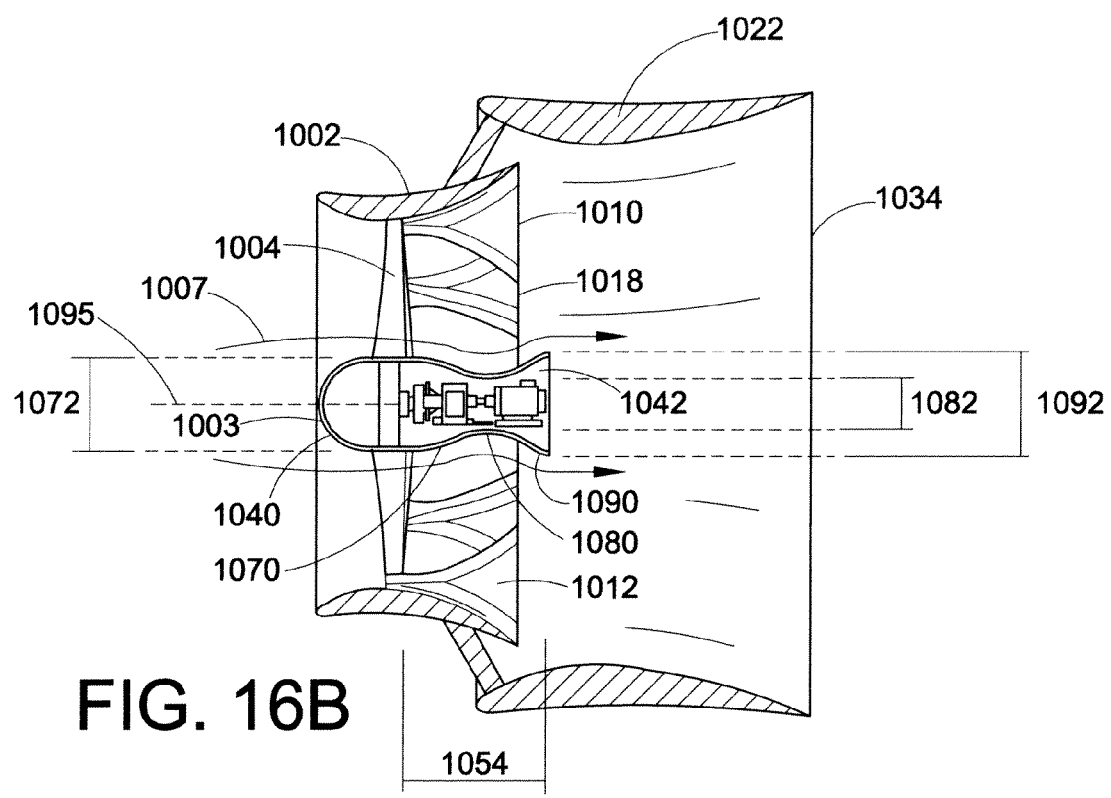
FIG. 16B is a side cross-sectional view of the wind turbine of FIG. 16A.

FIG. 16A and FIG. 16B illustrate yet another exemplary embodiment of a nacelle body. The turbine 1000 comprises a turbine shroud 1002, an ejector shroud 1022, and a nacelle body 1003. An impeller 1004 is engaged with the nacelle body 1003. Support members 1005 extend between the turbine shroud 1002 and the ejector shroud 1022. High energy mixing lobes 1012 and low energy mixing lobes 1014 are formed on a trailing edge 1010 of the turbine shroud. The trailing edge 1010 of the turbine shroud defines a turbine shroud outlet end 1018. Similarly, the trailing edge 1032 of the ejector shroud defines an ejector shroud outlet end 1034.

The nacelle body 1003 has a leading surface 1040, an exterior surface 1050, and a trailing surface 1060. The nacelle body of this exemplary embodiment differs from those previously described in that the leading surface 1040 is solid or unbroken. Put another way, there are no inlet openings present on the leading surface. The nacelle body is hollow, or in other words contains an interior cavity 1042. Equipment 1043 is shown in the interior cavity.

The nacelle body 1003 can again be described as comprising a front portion 1070, a central portion 1080, and a rear portion 1090. The front portion 1070 of the nacelle body 1003 extends from the impeller 1004 to the central portion 1080. The central portion 1080 extends downstream from the front portion 1070 to the rear portion 1090. Put another way, the front portion 1070, central portion 1080, and rear portion 1090 are directly connected to each other. The rear portion 1090 extends downstream from the central portion 1080 to the trailing surface 1060.

Here, the trailing surface 1060 is located downstream of the turbine shroud outlet end 1018. The trailing surface 1060 is also located upstream of the ejector shroud outlet end 1034. Put another way, the length 1054 of the nacelle body downstream of the impeller places the trailing surface 1060 within the ejector shroud 1022. The trailing surface is also solid or unbroken, or in other words contains no outlet openings.

The front portion 1070 has a first diameter 1072. The central portion 1080 has a second diameter 1082 that is less than the first diameter 1072. The rear portion 1090 has a third diameter 1092. The third diameter 1092 is greater than the second diameter 1082. The third diameter can be greater than, substantially equal to, or less than the first diameter 1072. The exterior surface 1050 here tapers between the first diameter 1072 and the second diameter 1082, then flares between the second diameter 1082 and the third diameter 1092. The exterior surface 1050 can also be described as a convex surface downstream of the impeller 1004 relative to a central axis 1095, or having a concave shape. This narrowing and flaring shape promotes airflow attachment 1007 to the exterior surface 1050 of the nacelle body 1003.

Figure 17A:
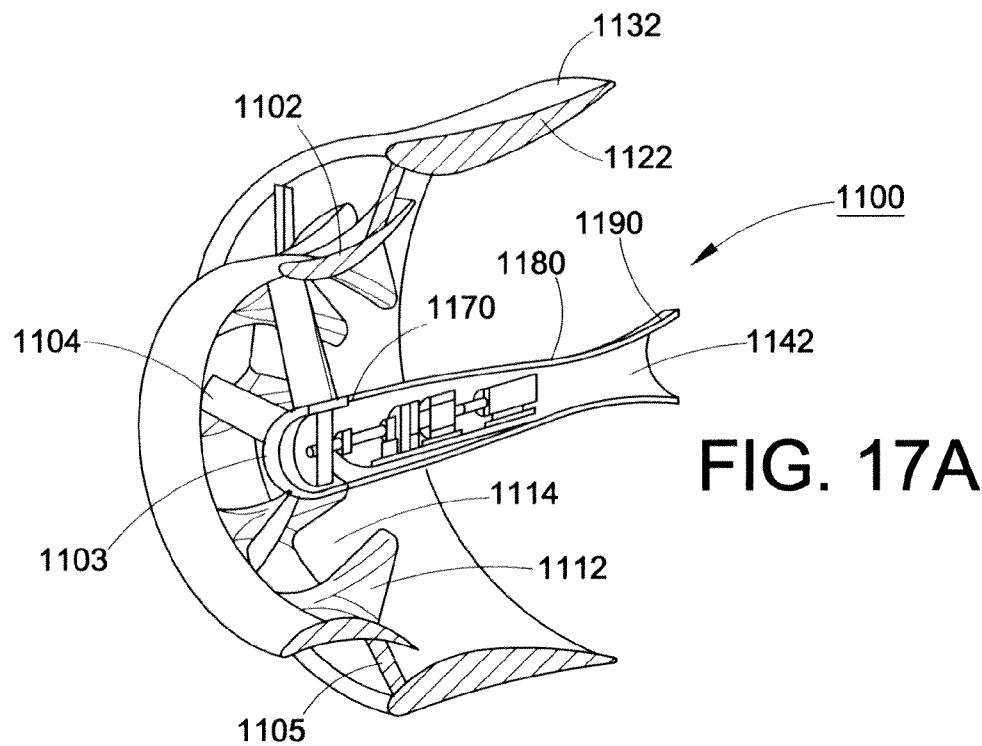
FIG. 17A is a perspective cross-sectional view of another exemplary embodiment of a wind turbine having a nacelle body with a solid leading surface. Here, the trailing surface is located downstream of the ejector shroud outlet end.
Figure 17B:
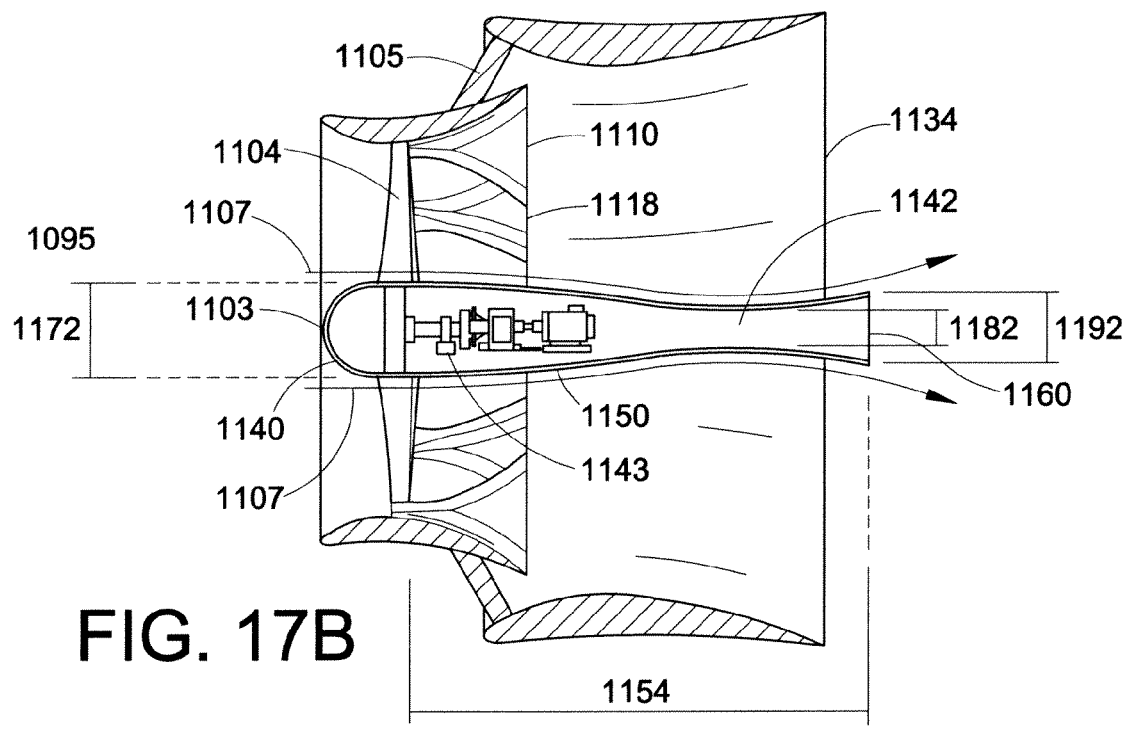
FIG. 17B is a side cross-sectional view of the wind turbine of FIG. 17A.

FIG. 17A and FIG. 17B illustrate another exemplary embodiment of a nacelle body for use in a shrouded wind turbine. The turbine 1100 comprises a turbine shroud 1102, an ejector shroud 1122, and a nacelle body 1103. An impeller 1104 is engaged with the nacelle body 1103. Support members 1105 extend between the turbine shroud 1102 and the ejector shroud 1122. High energy mixing lobes 1112 and low energy mixing lobes 1114 are formed on a trailing edge 1110 of the turbine shroud. The trailing edge 1110 of the turbine shroud defines a turbine shroud outlet end 1118. Similarly, the trailing edge 1132 of the ejector shroud defines an ejector shroud outlet end 1134.

The nacelle body 1103 has a leading surface 1140, an exterior surface 1150, and a trailing surface 1160. Again, the leading surface 1140 is solid or unbroken. Put another way, there are no inlet openings present on the leading surface. The nacelle body is hollow, or in other words contains an interior cavity 1142. Equipment 1143 is shown in the interior cavity.

The nacelle body 1103 comprises a front portion 1170, a central portion 1180, and a rear portion 1190. The front portion 1170 of the nacelle body 1103 extends from the impeller 1104 to the central portion 1180. The central portion 1180 extends downstream from the front portion 1170 to the rear portion 1190. Put another way, the front portion 1170, central portion 1180, and rear portion 1190 are directly connected to each other. The rear portion 1190 extends downstream from the central portion 1180 to the trailing surface 1160.

The front portion 1170 has a first diameter 1172. The central portion 1180 has a second diameter 1182 that is less than the first diameter 1172. The rear portion 1190 has a third diameter 1192. The third diameter 1192 is greater than the second diameter 1182. The third diameter can be greater than, substantially equal to, or less than the first diameter 1172. The exterior surface 1150 slopes downward from the first diameter 1172 to the second diameter 1182, then slopes upward from the second diameter 1182 to the third diameter 1192. This narrowing and flaring shape promotes airflow attachment 1107 to the exterior surface 1150 of the nacelle body 1103.

The nacelle body of FIG. 17B differs from the nacelle body of FIG. 16B in the length of the nacelle body. Here, the trailing surface 1160 is located downstream of the turbine shroud outlet end 1118. The trailing surface 1160 is also located downstream of the ejector shroud outlet end 1134. Put another way, the length 1154 of the nacelle body downstream of the impeller places the trailing surface 1160 outside the ejector shroud 1122. In addition, the trailing surface 1160 here is one large outlet opening.

Figure 18A:
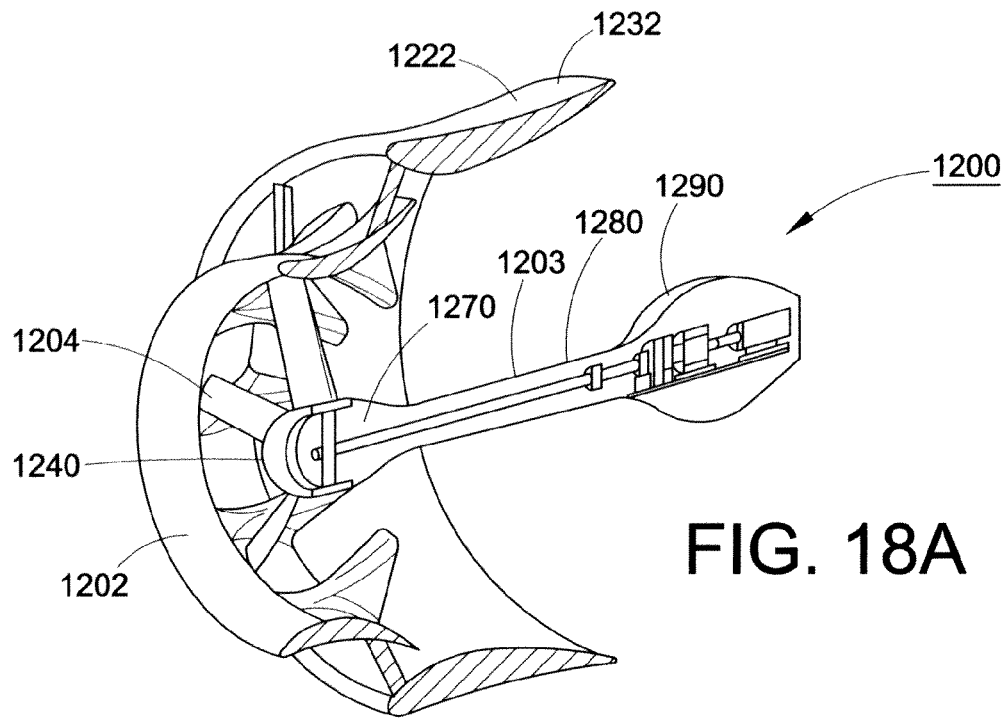
FIG. 18A is a perspective view of another exemplary embodiment of a shrouded wind turbine having a nacelle body with a solid leading surface. Here, the rear portion has a bulbous shape.
Figure 18B:
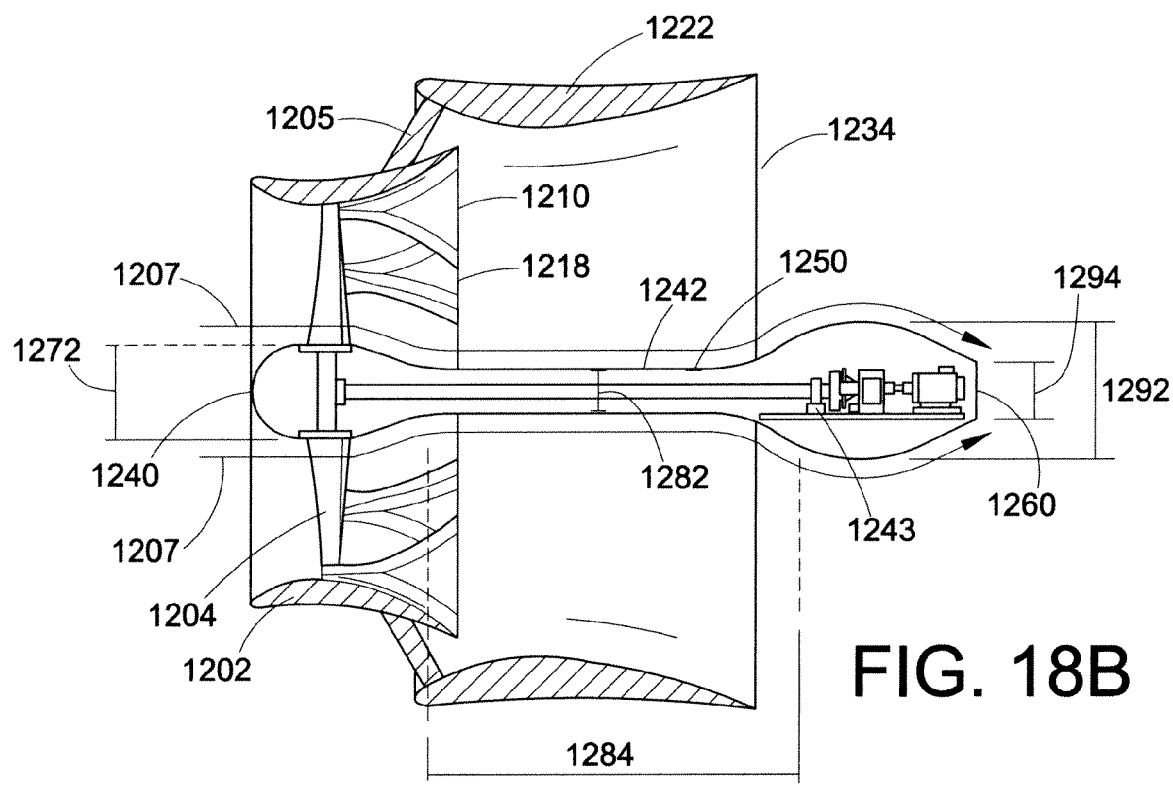
FIG. 18B is a side cross-sectional view of the wind turbine of FIG. 18A.

FIG. 18A and FIG. 18B illustrate an exemplary embodiment of a nacelle body with a geometry that is somewhat different from those already presented. The turbine 1200 comprises a turbine shroud 1202, an ejector shroud 1222, and a nacelle body 1203. An impeller 1204 is engaged with the nacelle body 1203. Support members 1205 extend between the turbine shroud 1202 and the ejector shroud 1222. High energy mixing lobes and low energy mixing lobes are formed on a trailing edge 1210 of the turbine shroud. The trailing edge 1210 of the turbine shroud defines a turbine shroud outlet end 1218. Similarly, the trailing edge 1232 of the ejector shroud defines an ejector shroud outlet end 1234.

The nacelle body 1203 has a leading surface 1240, an exterior surface 1250, and a trailing surface 1260. Again, the leading surface 1240 is solid or unbroken. Put another way, there are no inlet openings present on the leading surface. The nacelle body is hollow, or in other words contains an interior cavity 1242.

The nacelle body 1203 comprises a front portion 1270, a central portion 1280, and a rear portion 1290. The front portion 1270 of the nacelle body 1203 extends from the impeller 1204 to the central portion 1280. The central portion 1280 extends downstream from the front portion 1270 to the rear portion 1290. Put another way, the front portion 1270, central portion 1280, and rear portion 1290 are directly connected to each other. The rear portion 1290 extends downstream from the central portion 1280 to the trailing surface 1260.

The front portion 1270 has a first diameter 1272. The central portion 1280 has a second diameter 1282 that is less than the first diameter 1272. The rear portion 1290 has a third diameter 1292. The third diameter 1292 is greater than the second diameter 1282. The third diameter can be greater than, substantially equal to, or less than the first diameter 1272. The exterior surface 1250 slopes downward from the first diameter 1272 to the second diameter 1282, then slopes upward from the second diameter 1282 to the third diameter 1292. This narrowing and flaring shape promotes airflow attachment 1207 to the exterior surface 1250 of the nacelle body 1203.

In the nacelle body of FIG. 16B, the rear portion 1290 is located downstream of the ejector shroud outlet end 1234. The trailing surface 1260 is also located downstream of the ejector shroud outlet end 1234. In addition, the trailing surface 1260 here is one large outlet opening. The rear portion can be described as having a bulb-like shape. The rear portion is hollow, and the energy generation equipment 1243 is located therein. The rear portion can be considered as having both a third diameter 1292 and a fourth diameter 1294. The fourth diameter is downstream of the third diameter. The fourth diameter 1294 is less than the third diameter 1292. Also, the central portion 1280 could be described as having a constant diameter along its length 1284.

Figure 19A:
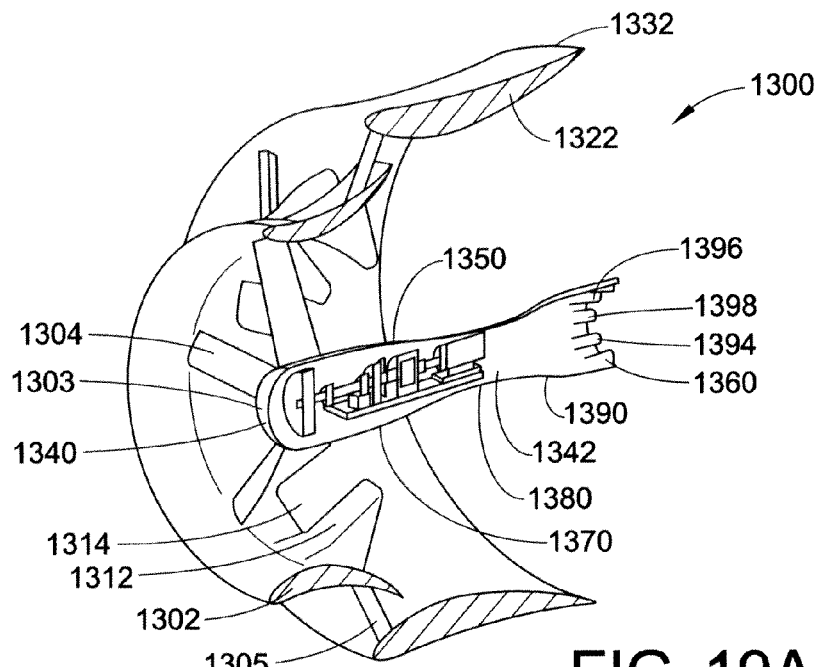
FIG. 19A is a perspective view of another exemplary embodiment of a shrouded wind turbine having a nacelle body with a solid leading surface. The diameter of the nacelle body varies along its length. A rear portion of the nacelle body comprises mixing lobes.
Figure 19B:
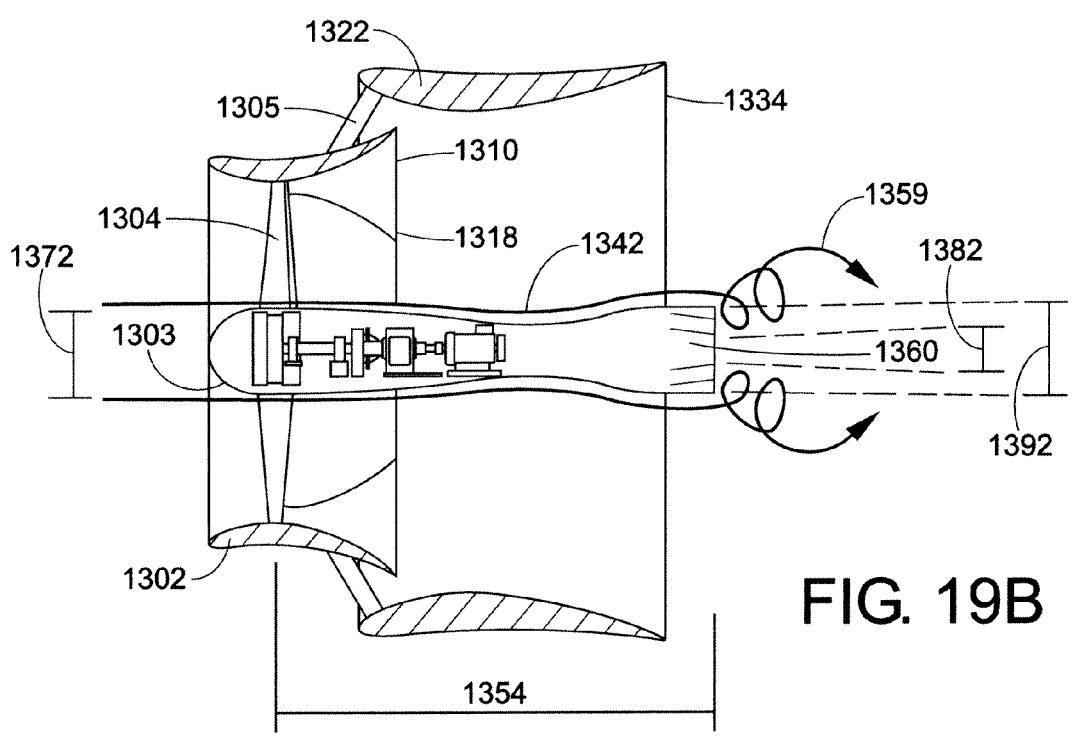
FIG. 19B is a side cross-sectional view of the wind turbine of FIG. 19A.

FIG. 19A and FIG. 19B illustrate yet another exemplary embodiment of a nacelle body. The turbine 1300 comprises a turbine shroud 1302, an ejector shroud 1322, and a nacelle body 1303. An impeller 1304 is engaged with the nacelle body 1303. Support members 1305 extend between the turbine shroud 1302 and the ejector shroud 1322. High energy mixing lobes 1312 and low energy mixing lobes 1314 are formed on a trailing edge 1310 of the turbine shroud. The trailing edge 1310 of the turbine shroud defines a turbine shroud outlet end 1318. Similarly, the trailing edge 1332 of the ejector shroud defines an ejector shroud outlet end 1334.

The nacelle body 1303 has a leading surface 1340, an exterior surface 1350, and a trailing surface 1360. Again, the leading surface 1340 is solid or unbroken. Put another way, there are no inlet openings present on the leading surface. The nacelle body is hollow, or in other words contains an interior cavity 1342.

The nacelle body 1303 comprises a front portion 1370, a central portion 1380, and a rear portion 1390. The front portion 1370 of the nacelle body 1303 extends from the impeller 1304 to the central portion 1380. The central portion 1380 extends downstream from the front portion 1370 to the rear portion 1390. Put another way, the front portion 1370, central portion 1380, and rear portion 1390 are directly connected to each other. The rear portion 1390 extends downstream from the central portion 1380 to the trailing surface 1360.

The front portion 1370 has a first diameter 1372. The central portion 1380 has a second diameter 1382 that is less than the first diameter 1372. The rear portion 1390 has a third diameter 1392. The third diameter 1392 is greater than the second diameter 1382. The third diameter can be greater than, substantially equal to, or less than the first diameter 1372. The exterior surface 1350 slopes downward from the first diameter 1372 to the second diameter 1382, then slopes upward from the second diameter 1382 to the third diameter 1392. This narrowing and flaring shape promotes airflow attachment to the exterior surface 1350 of the nacelle body 1303.

Here, the trailing surface 1360 is located downstream of the turbine shroud outlet end 1318. The trailing surface 1360 is also located downstream of the ejector shroud outlet end 1334. Put another way, the length 1354 of the nacelle body downstream of the impeller places the trailing surface 1360 outside the ejector shroud 1322.

The rear portion 1390 also includes mixing lobes formed thereon. The trailing edge 1394 of the nacelle body 1303 has a circular crenellated shape and the exterior surface flows from a lobe line 1356 to the trailing edge 1394. A set of first mixing lobes 1396 is thus formed, as well as a set of second mixing lobes 1398. These mixing lobes cause air flowing along the exterior surface 1350 to form vortices 1359 and mix. The trailing surface 1360 can have one large outlet opening, or be a solid surface.

Figure 20A:
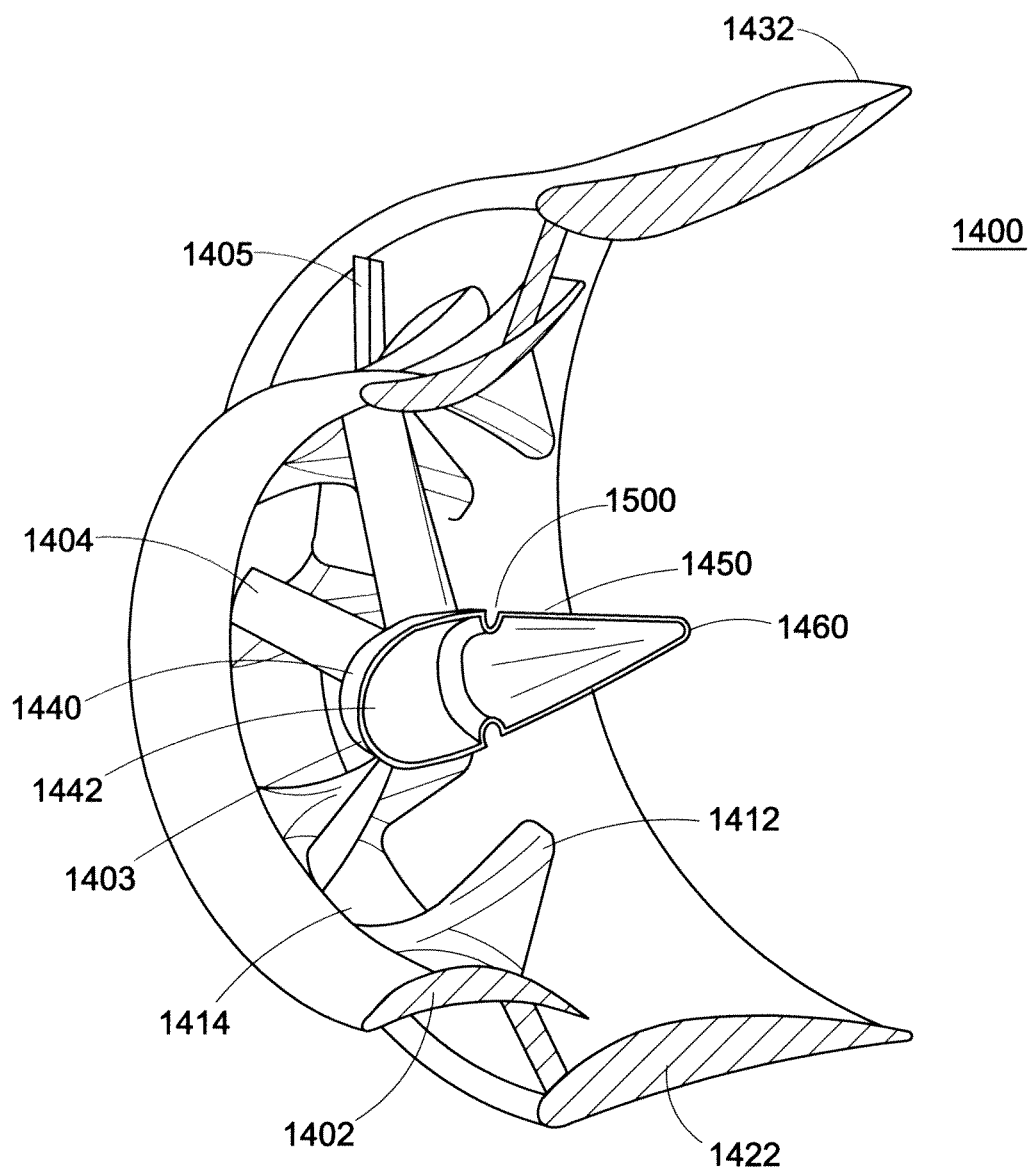
FIG. 20A is a perspective cross-sectional view of an exemplary embodiment of a shrouded wind turbine having a nacelle body with an annular groove.

FIGS. 20A-20C illustrate an exemplary embodiment of a nacelle body for use in a shrouded wind turbine. Generally speaking, the nacelle body includes an annular groove. FIG. 20A is a perspective cross-sectional view, FIG. 20B is a side cross-sectional view, and FIG. 20C is an enlarged view of the annular groove.

The turbine 1400 comprises a turbine shroud 1402, an ejector shroud 1422, and a nacelle body 1403. An impeller 1404 is engaged with the nacelle body 1403. Support members 1405 extend between the turbine shroud 1402 and the ejector shroud 1422. High energy mixing lobes 1412 and low energy mixing lobes 1414 are formed on a trailing edge 1410 of the turbine shroud. The trailing edge 1410 of the turbine shroud defines a turbine shroud outlet end 1418. Similarly, the trailing edge 1432 of the ejector shroud defines an ejector shroud outlet end 1434.

The nacelle body 1403 has a leading surface 1440, an exterior surface 1450, and a trailing surface 1460. Again, the leading surface 1440 is solid or unbroken. Put another way, there are no inlet openings present on the leading surface. The nacelle body is hollow, or in other words contains an interior cavity 1442. The exterior surface 1450 tapers downward from the impeller 1406 all the way to the trailing surface 1460. Put another way, the exterior surface 1450 downstream of the impeller 1404 can be described as forming a conical shape.

Here, the trailing surface 1460 is located downstream of the turbine shroud outlet end 1418. The trailing surface 1460 is also located upstream of the ejector shroud outlet end 1434. Put another way, the length 1454 of the nacelle body downstream of the impeller places the trailing surface 1460 within the ejector shroud 1422. The trailing surface is also solid or unbroken, or in other words contains no outlet openings.

An annular groove 1500 is present in the nacelle body 1403 downstream of the impeller 1404. The annular groove can also be considered as being in the exterior surface 1450. The annular groove 1500 has an arcuate cross section 1510 with an upstream point 1512 and a downstream point 1514. The upstream point 1512 connects to the exterior surface 1450 at a first exterior point 1516 to form a first lip 1520. The downstream point 1514 connects to the exterior surface 1450 at a second exterior point 1518 to form a second lip 1530. The first lip has an acute angle $\omega$. It is contemplated that compressed air can be introduced into the annular groove, as illustrated by arrow 1540. The compressed air 1540 increases the volume of air in the airflow 1550 near the exterior surface of the nacelle body, preventing separation.

Figure 21A:
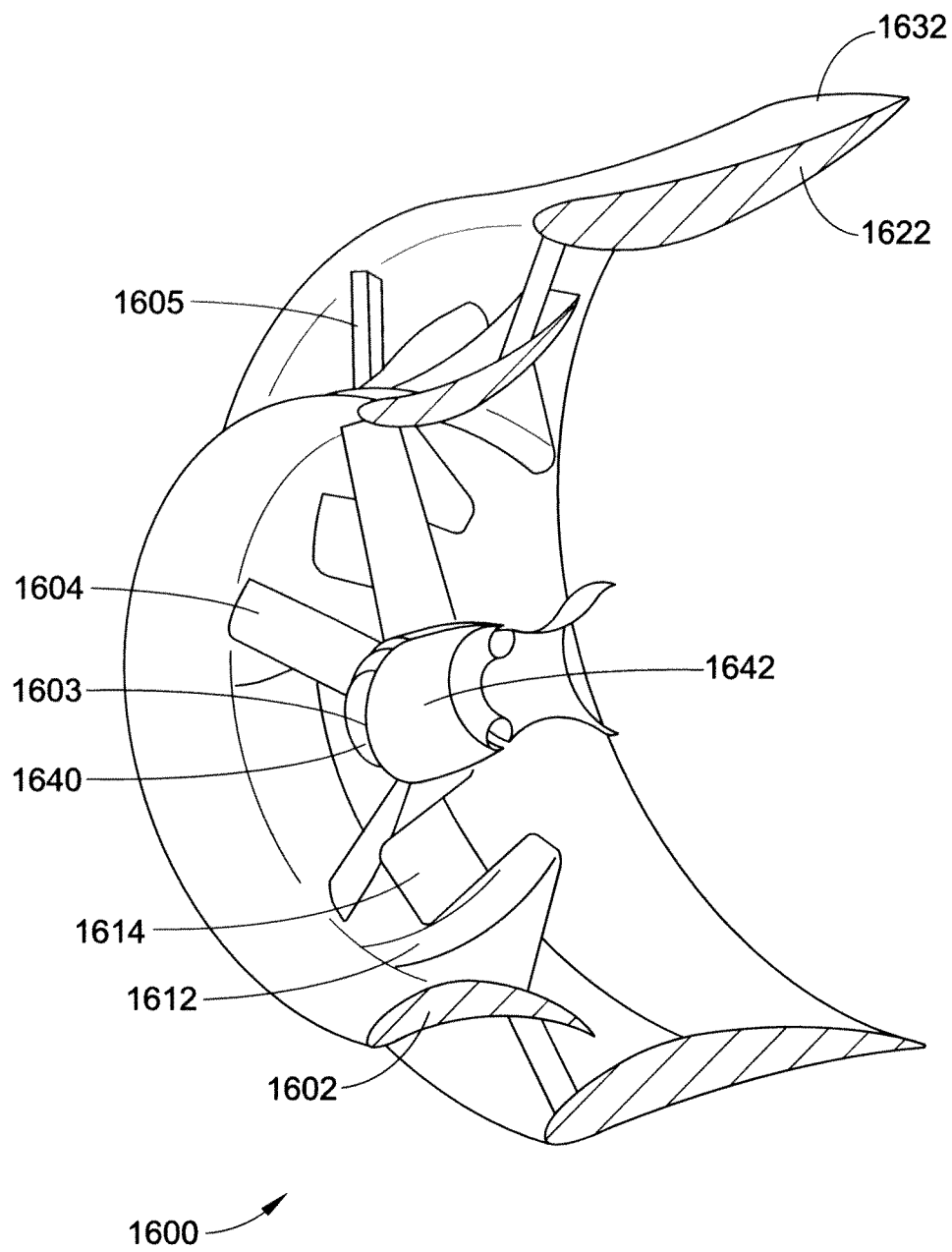
FIG. 21A is a perspective cross-sectional view of another exemplary embodiment of a shrouded wind turbine having a nacelle body with an annular groove.
Figure 21C:
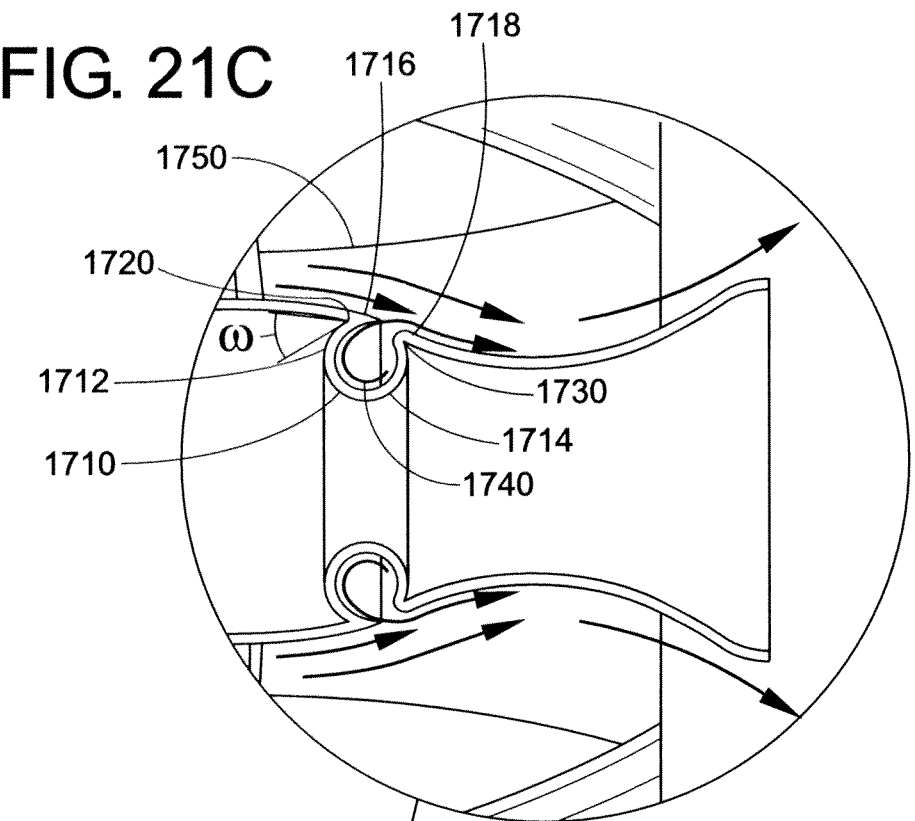
FIG. 21C is an enlarged view of the annular groove in FIG. 21B.
Figure 21B:
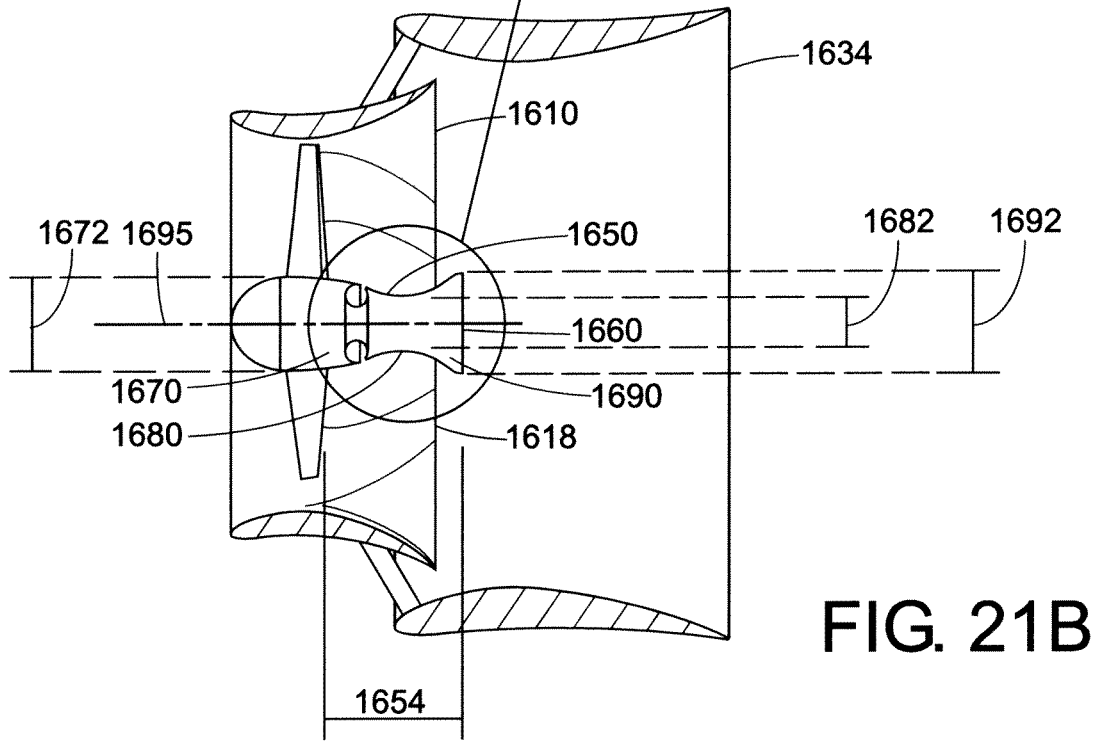
FIG. 21B is a side cross-sectional view of the wind turbine of FIG. 21A.

FIGS. 21A-21C illustrate another exemplary embodiment of a nacelle body having an annular groove. FIG. 21A is a perspective cross-sectional view, FIG. 21B is a side cross-sectional view, and FIG. 21C is an enlarged view of the annular groove.

The turbine 1600 comprises a turbine shroud 1602, an ejector shroud 1622, and a nacelle body 1603. An impeller 1604 is engaged with the nacelle body 1603. Support members 1605 extend between the turbine shroud 1602 and the ejector shroud 1622. High energy mixing lobes 1612 and low energy mixing lobes 1614 are formed on a trailing edge 1610 of the turbine shroud. The trailing edge 1610 of the turbine shroud defines a turbine shroud outlet end 1618. Similarly, the trailing edge 1632 of the ejector shroud defines an ejector shroud outlet end 1634.

The nacelle body 1603 has a leading surface 1640, an exterior surface 1650, and a trailing surface 1660. Again, the leading surface 1640 is solid or unbroken. Put another way, there are no inlet openings present on the leading surface. The nacelle body is hollow, or in other words contains an interior cavity 1642.

The nacelle body 1603 comprises a front portion 1670, a central portion 1680, and a rear portion 1690. The front portion 1670 of the nacelle body 1603 extends from the impeller 1604 to the central portion 1680. The central portion 1680 extends downstream from the front portion 1670 to the rear portion 1690. Put another way, the front portion 1670, central portion 1680, and rear portion 1690 are directly connected to each other. The rear portion 1690 extends downstream from the central portion 1680 to the trailing surface 1660.

The front portion 1670 has a first diameter 1672. The central portion 1680 has a second diameter 1682 that is less than the first diameter 1672. The rear portion 1690 has a third diameter 1692. The third diameter 1692 is greater than the second diameter 1682. The third diameter can be greater than, substantially equal to, or less than the first diameter 1672. The exterior surface 1650 here tapers between the first diameter 1672 and the second diameter 1682, then flares between the second diameter 1682 and the third diameter 1692. The exterior surface 1650 can also be described as a convex surface downstream of the impeller 1604 relative to a central axis 1695, or having a concave shape.

Here, the trailing surface 1660 is located downstream of the turbine shroud outlet end 1618. The trailing surface 1660 is also located upstream of the ejector shroud outlet end 1634. Put another way, the length 1654 of the nacelle body downstream of the impeller places the trailing surface 1660 within the ejector shroud 1622. The trailing surface can be solid or can have outlet openings.

The annular groove 1700 is present in the nacelle body 1603 downstream of the impeller 1604. The annular groove 1700 has an arcuate cross section 1710 with an upstream point 1712 and a downstream point 1714. The upstream point 1712 connects to the exterior surface 1650 at a first exterior point 1716 to form a first lip 1720. The downstream point 1714 connects to the exterior surface 1650 at a second exterior point 1718 to form a second lip 1730. The first lip 1720 has an acute angle w. It is contemplated that compressed air can be introduced into the annular groove, as illustrated by arrow 1740. The compressed air 1740 increases the volume of air in the airflow 1750 near the exterior surface of the nacelle body, preventing separation. The annular groove 1700 here is considered as being in the front portion 1670 or the central portion 1680.

Figure 22A:
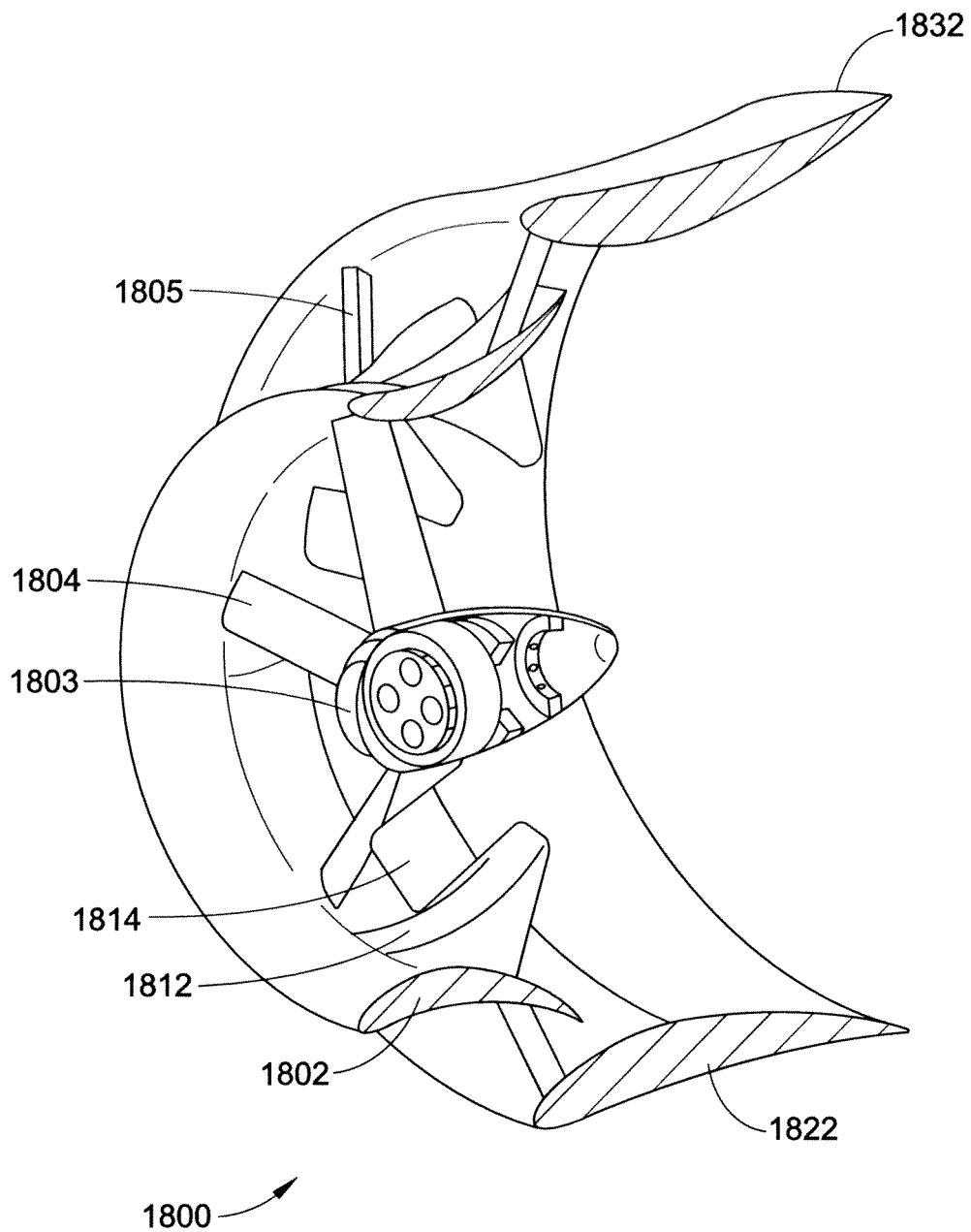
FIG. 22A is a perspective cross-sectional view of another exemplary embodiment of a shrouded wind turbine having a nacelle body with an annular groove.

FIGS. 22A-22C illustrate another exemplary embodiment of a nacelle body having an annular groove. FIG. 22A is a perspective cross-sectional view, FIG. 22B is a side cross-sectional view, and FIG. 22C is an enlarged view of the annular groove.

The turbine 1800 comprises a turbine shroud 1802, an ejector shroud 1822, and a nacelle body 1803. An impeller 1804 is engaged with the nacelle body 1803. Support members 1805 extend between the turbine shroud 1802 and the ejector shroud 1822. High energy mixing lobes 1812 and low energy mixing lobes 1814 are formed on a trailing edge 1810 of the turbine shroud. The trailing edge 1810 of the turbine shroud defines a turbine shroud outlet end 1818. Similarly, the trailing edge 1832 of the ejector shroud defines an ejector shroud outlet end 1834.

The nacelle body 1803 has a leading surface 1840, an exterior surface 1850, and a trailing surface 1860. Again, the leading surface 1840 is solid or unbroken. Put another way, there are no inlet openings present on the leading surface. The nacelle body is hollow, or in other words contains an interior cavity 1842. The exterior surface 1850 tapers downward from the impeller 1804 all the way to the trailing surface 1860. Put another way, the exterior surface 1850 downstream of the impeller 1804 can be described as having a spheroidal surface downstream of the impeller 1804 relative to a central axis 1895, or as forming a spheroidal shape.

Here, the trailing surface 1860 is located downstream of the turbine shroud outlet end 1818. The trailing surface 1860 is also located upstream of the ejector shroud outlet end 1834. The trailing surface is also solid or unbroken, or in other words contains no outlet openings.

An annular groove 1900 is present in the nacelle body 1803 downstream of the impeller 1804. The annular groove can also be considered as being in the exterior surface 1850. As seen in the cross-sectional view of FIG. 22C, the annular groove 1900 has an upstream side 1912 and a downstream side 1914. The upstream side 1912 and downstream side 1914 are substantially perpendicular to the central axis 1895. The upstream side 1912 connects to the exterior surface 1850 at a first exterior point 1916. The downstream side 1914 connects to the exterior surface 1850 at a second exterior point 1918. The upstream side 1912 and downstream side 1914 are joined together by a base 1920. As shown here, the base 1920 is substantially parallel to the central axis 1895. A plurality of axial inlets 1930 is present in the base 1920. It is contemplated that the axial inlets are used to create a vacuum, or in other words to reduce the pressure in the annular groove 1900 relative to the pressure beyond the exterior surface. The suction caused by the reduced pressure would pull airflow 1940 against the exterior surface, preventing separation.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A shrouded horizontal axis wind turbine, comprising:
   an impeller;
   a turbine shroud surrounding the impeller, the turbine shroud having mixing lobes formed on a trailing edge thereof, the trailing edge defining a turbine shroud outlet end; and
   a nacelle body, the nacelle body comprising:
   one or more inlet openings on a leading surface of the nacelle body leading into an interior cavity; and one or more outlet openings on a trailing surface of the nacelle body leading from the interior cavity, the trailing surface being located downstream of the turbine shroud outlet end.

2. A wind turbine according to claim 1, further comprising an ejector shroud surrounding the turbine shroud, the ejector shroud having an inlet end and an outlet end, the turbine shroud outlet end extending into the ejector shroud inlet end.

3. A wind turbine according to claim 2, wherein the trailing surface of the nacelle body extends downstream of the ejector shroud outlet end.

4. A wind turbine according to claim 2, wherein the trailing surface of the nacelle body is located upstream of the ejector shroud outlet end.

5. A wind turbine according to claim 1, wherein the nacelle body has a constant diameter along a length of the nacelle body downstream of the leading surface.

6. A wind turbine according to claim 1, wherein the nacelle body further comprises a front portion, a central portion, and a rear portion;
the front portion having a first diameter;
the central portion extending from the front portion to the rear portion, the central portion having a second diameter less than the first diameter; and
the rear portion having a third diameter greater than the second diameter.

7. The wind turbine according to claim 6, wherein the rear portion further comprises mixing lobes formed thereon.

8. A wind turbine according to claim 1, wherein the one or more outlet openings are located downstream of the turbine shroud outlet end.

9. A shrouded horizontal axis wind turbine, comprising: an impeller;
a turbine shroud surrounding the impeller, the turbine shroud having mixing lobes formed on a trailing edge thereof, the trailing edge defining a turbine shroud outlet end; and
a nacelle body comprising:
a leading surface;
a front portion having a first diameter;
a central portion located downstream of the front portion and having a second diameter smaller than the first diameter;
a rear portion located downstream of the central portion and having a third diameter greater than the second diameter; and
a trailing surface located downstream of the turbine shroud outlet end.

10. A wind turbine according to claim 9, further comprising an ejector shroud surrounding the turbine shroud, the ejector shroud having an inlet end and an outlet end, the turbine shroud outlet end extending into the ejector shroud inlet end.

11. A wind turbine according to claim 10, wherein the trailing surface of the nacelle body extends downstream of the ejector shroud outlet end.

12. A wind turbine according to claim 10, wherein the trailing surface of the nacelle body is located upstream of the ejector shroud outlet end.

13. A wind turbine according to claim 9, wherein the rear portion comprises mixing lobes formed thereon.

14. A wind turbine according to claim 9, wherein the first diameter, the second diameter, and the third diameter are substantially equal.

15. A wind turbine according to claim 9, wherein the rear portion further comprises a fourth diameter downstream of the third diameter, the fourth diameter being less than the third diameter.

16. A shrouded horizontal axis wind turbine, comprising:
an impeller;
a turbine shroud surrounding the impeller, the turbine shroud having mixing lobes formed on a trailing edge thereof, the trailing edge defining a turbine shroud outlet end; and
a nacelle body comprising:
a leading surface;
an exterior surface downstream of the impeller; and an annular groove in the exterior surface.

17. A wind turbine according to claim 16, wherein the annular groove comprises:
an arcuate cross section having a downstream point and an upstream point;
a first lip connecting the upstream point to an exterior surface of the nacelle body, the first lip having an acute angle; and
a second lip connecting the downstream point to the exterior surface of the nacelle body.

18. A wind turbine according to claim 16, wherein a cross-sectional view of the annular groove comprises:
an upstream side and a downstream side, the upstream side and downstream side being perpendicular to a central axis of the nacelle body;
a base joining the upstream side and the downstream side; and
a plurality of axial inlets in the base.

19. A wind turbine according to claim 16, wherein the nacelle body further comprises:
a front portion having a first diameter;
a central portion located downstream of the front portion and having a second diameter; and
a rear portion located downstream of the central portion and having a third diameter;
wherein the second diameter is less than the first diameter, and the third diameter is greater than the second diameter.

20. A wind turbine according to claim 16, further comprising an ejector shroud surrounding the turbine shroud, the ejector shroud having an inlet end and an outlet end, the turbine shroud outlet end extending into the ejector shroud inlet end.

* * * * *